(12) United States Patent
Goodlin et al.

(10) Patent No.: US 10,407,842 B2
(45) Date of Patent: Sep. 10, 2019

(54) ROLLER DEVICES AND SYSTEMS AND METHODS FOR USING SAME

(71) Applicants: Darren L. Goodlin, Larkspur, IL (US); Robert Loeschner, Mascoutah, IL (US)

(72) Inventors: Darren L. Goodlin, Larkspur, IL (US); Robert Loeschner, Mascoutah, IL (US)

(73) Assignee: Mole Patrol, LLC, Mascoutah, IL (US)

( * ) Notice: Subject to any disclaimer, the term of this patent is extended or adjusted under 35 U.S.C. 154(b) by 0 days.

(21) Appl. No.: 15/700,049

(22) Filed: Sep. 8, 2017

(65) Prior Publication Data

US 2018/0066405 A1 Mar. 8, 2018

Related U.S. Application Data

(60) Provisional application No. 62/384,892, filed on Sep. 8, 2016.

(51) Int. Cl.
*E01C 19/26* (2006.01)
*A01B 29/02* (2006.01)
*A01B 29/06* (2006.01)

(52) U.S. Cl.
CPC .............. *E01C 19/26* (2013.01); *A01B 29/02* (2013.01); *A01B 29/06* (2013.01)

(58) Field of Classification Search
CPC .......... E01C 19/26; A01B 29/02; A01B 29/06
USPC ....................................................... 172/170
See application file for complete search history.

(56) References Cited

U.S. PATENT DOCUMENTS

| 247,698 | A | * | 9/1881 | Sherwin | ................ | E01C 19/27 404/126 |
| 634,737 | A | * | 10/1899 | Newman | ................ | E01C 19/27 404/126 |
| 649,423 | A | * | 5/1900 | Hinman | ................ | E01C 19/26 404/122 |
| 2,532,806 | A | * | 12/1950 | Gifford | ................ | E01C 19/26 280/124.115 |
| 3,947,142 | A | * | 3/1976 | Takata | ................ | E01C 19/26 404/126 |
| 7,124,835 | B2 | * | 10/2006 | Piou | ................ | A01B 29/043 172/539 |

* cited by examiner

*Primary Examiner* — Tara Mayo-Pinnock
(74) *Attorney, Agent, or Firm* — Bekiares Eliezer LLP

(57) ABSTRACT

Disclosed herein are self-guiding roller devices and system for compressing a medium. In one aspect, the roller devices and systems include: an attachment frame having a first pivot portion and configured to connect to a powered machine; a roller assembly including at least one rotatable roller component and at least one roller frame having a second pivot portion being configured to connect to the first pivot portion; and a pivot member configured to connect the first and second pivot portions, the roller assembly being able to rotate 360-degrees about the attachment frame while being driven from behind by an attached powered machine. Also disclosed herein are methods of using the disclosed roller devices and systems.

20 Claims, 17 Drawing Sheets

ROLLER DEVICES AND SYSTEMS AND METHODS FOR USING SAME

CROSS REFERENCE TO RELATED APPLICATIONS

This application claims the benefit of priority to U.S. Provisional Patent Application Ser. No. 62/384,892, filed Sep. 8, 2016, which is hereby incorporated herein by reference in its entirety.

FIELD OF INVENTION

The present invention relates to devices and systems for compressing medium, such as the ground and earth, and methods for using the devices and systems.

BACKGROUND OF THE INVENTION

It is known, certain types of rodents, such as ground moles and the like, burrow in the earth and create surface tunnels and ridges. These rodents form ground surface ridges by burrowing the earth while the lawn is forced up during the burrowing activities. To this end, these molehills and underground tunnels cause substantial harm to the aesthetics and underlying ground structure. The use of large, power driven ground compression machines are generally needed to reverse the visible effects of the rodent activity. However, large power driven compression machine are unable to fit within the limited maneuverable space of most lawns and landscaping areas. Moreover, pulling a 270-pound roller through lawns and landscaping can be extremely laborious and difficult. Furthermore, the use of a traditional pull-behind rollers has not been an acceptable solution due to its limited positioning and maneuverability in yards with restricted access.

Therefore, there remains a need for improved devices and systems for ground compression. Additionally, the devices and systems should be easy to maneuver in areas with limited access and be versatile enough to work with existing equipment utilized by landscapers, grounds maintenance and commercial lawn care crews. This need and other needs are satisfied by the various aspects of the present disclosure.

SUMMARY OF THE INVENTION

In accordance with the purposes of the invention, as embodied and broadly described herein, the invention, in one aspect, relates to a roller device for attachment to a powered machine. In further aspects, the roller device comprises an attachment frame configured to connect to a powered machine, the attachment frame comprising: at least one support arm having first and second opposed ends, the first end having a first pivot portion configured to receive a pivot member, and the second end being configured to connect to a portion of the powered machine; a roller assembly comprising: at least one rotatable roller component; at least one roller frame having first and second ends, the first end being rotatably connected to a first end of the roller component with a rotating means configured to allow rotation of the roller component, the second end being rotatably connected to a second end of the roller component using a rotating means configured to allow rotation of the roller component, and the roller frame having a second pivot portion being configured to connect to the first pivot portion; and a pivot member configured to connect the first and second pivot portions. In still further aspects, when the first and second pivot portions are connected by the pivot member, the roller assembly can rotate about the attachment frame. In some aspects, when the roller device is attached to a front portion of the powered machine, the roller assembly can be configured to be pulled forward in a desired path upon forward movement of an attached powered machine. In other aspects, when the roller device is attached to a rear portion of the powered machine, the roller assembly can be configured to be pulled forward in a desired path upon forward movement of an attached powered machine.

In another exemplary aspect, the invention relates to a ground compressing system, the system comprising: a powered machine; a roller device comprising: an attachment frame configured to connect to the powered machine, the attachment frame comprising: at least one support arm having first and second opposed ends, the first end having a first pivot portion configured to receive a pivot member, and the second end being configured to connect to a portion of the powered machine; a roller assembly comprising: at least one rotatable roller component; at least one roller frame having first and second ends, the first end being rotatably connected to a first end of the roller component with a rotating means configured to allow rotation of the roller component, the second end being rotatably connected to a second end of the roller component using a rotating means configured to allow rotation of the roller component, and the roller frame having a second pivot portion being configured to connect to the first pivot portion; and a pivot member configured to connect the first and second pivot portions; wherein when the first and second pivot portions are connected by the pivot member, the roller assembly can rotate about the attachment frame; wherein when the roller device is attached to a front portion of the powered machine, the roller assembly is configured to be pulled forward in a desired path upon forward movement of an attached powered machine; and wherein when the roller device is attached to a rear portion of the powered machine, the roller assembly is configured to be pulled forward in a desired path upon forward movement of an attached powered machine.

In further aspects, the invention also relates to methods for using the disclosed devices and systems, for example, compressing a medium.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION OF THE INVENTION

Figure 1:
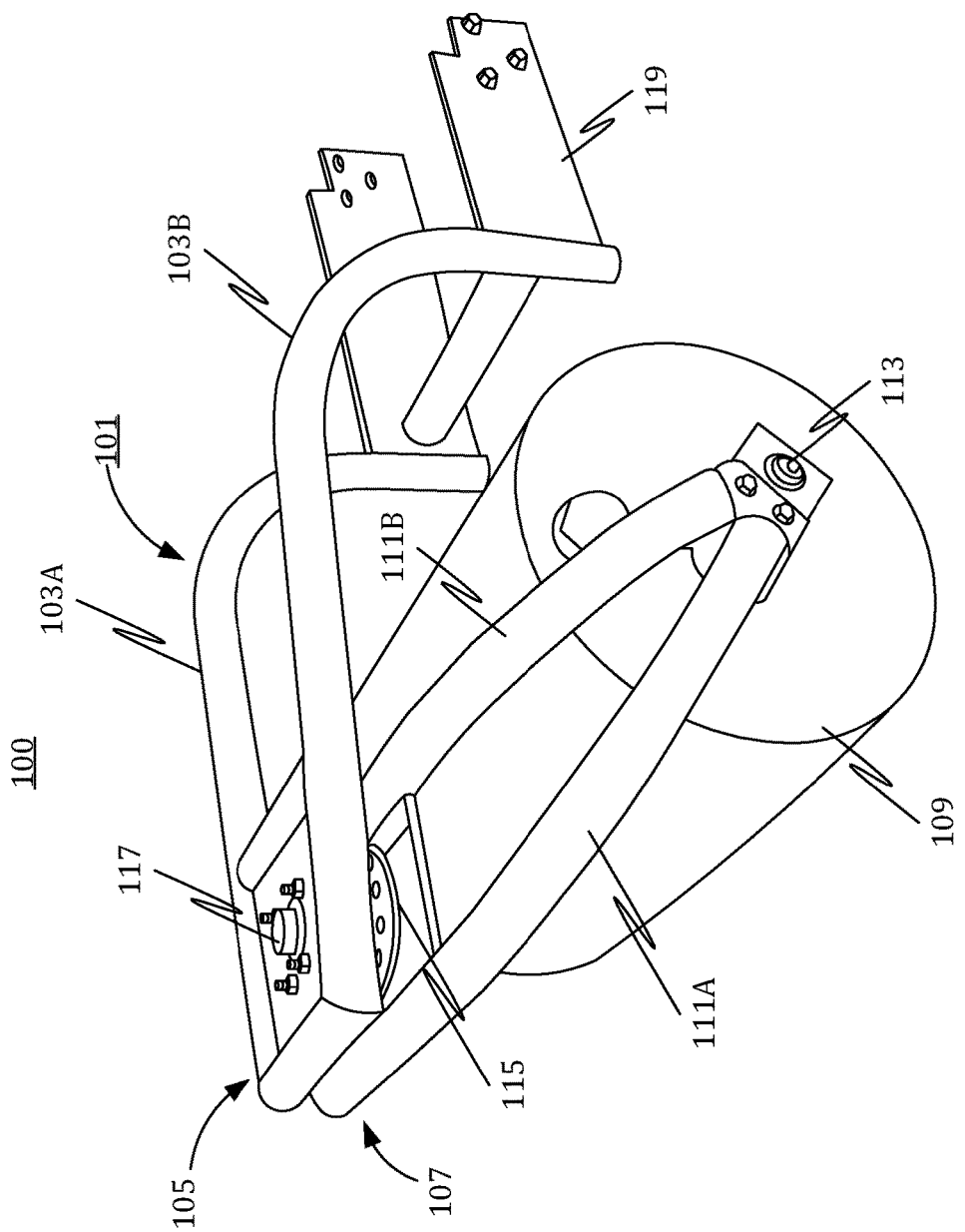
FIG. 1 shows a depiction of a roller device for attachment to a powered machine in accordance with an exemplary embodiment of the present invention.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a roller component" includes two or more roller components.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the invention as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

As briefly described above, the present disclosure relates, in various aspects, to roller devices and systems for compressing a medium, such as the ground, earth, dirt, gravel, rock, sand or the like. In one aspect, the present disclosure provides a roller device for attachment to a powered machine. In further aspects, the roller device comprises an attachment frame configured to connect to a powered machine, the attachment frame comprising: at least one support arm having first and second opposed ends, the first end having a first pivot portion configured to receive a pivot member, and the second end being configured to connect to a portion of the powered machine; a roller assembly comprising: at least one rotatable roller component; at least one roller frame having first and second ends, the first end being rotatably connected to a first end of the roller component with a rotating means configured to allow rotation of the roller component, the second end being rotatably connected to a second end of the roller component using a rotating means configured to allow rotation of the roller component, and the roller frame having a second pivot portion being configured to connect to the first pivot portion; and a pivot member configured to connect the first and second pivot portions; wherein when the first and second pivot portions are connected by the pivot member, the roller assembly can rotate about the attachment frame; wherein when the roller device is attached to a front portion of the powered machine, the roller assembly is configured to be pulled forward in a desired path upon forward movement of an attached powered machine; and wherein when the roller device is attached to a rear portion of the powered machine, the roller assembly is configured to be pulled forward in a desired path upon forward movement of an attached powered machine.

In another aspect, the present disclosure provides a ground compressing system for controlling burrowing rodents, the system comprising: a powered machine; a roller device comprising: an attachment frame configured to connect to the powered machine, the attachment frame comprising: at least one support arm having first and second opposed ends, the first end having a first pivot portion configured to receive a pivot member, and the second end being configured to connect to a portion of the powered machine; a roller assembly comprising: at least one rotatable roller component; at least one roller frame having first and second ends, the first end being rotatably connected to a first end of the roller component with a rotating means configured to allow rotation of the roller component, the second end being rotatably connected to a second end of the roller component using a rotating means configured to allow rotation of the roller component, and the roller frame having a second pivot portion being configured to connect to the first pivot portion; and a pivot member configured to connect the first and second pivot portions; wherein when the first and second pivot portions are connected by the pivot member, the roller assembly can rotate about the attachment frame; wherein when the roller device is attached to a front portion of the powered machine, the roller assembly is configured to be pulled forward in a desired path upon forward movement of an attached powered machine; and wherein when the roller device is attached to a rear portion of the powered machine, the roller assembly is configured to be pulled forward in a desired path upon forward movement of an attached powered machine.

In a further aspect, the first and second pivot portions can be connected by the pivot member. In a still further aspect, the roller assembly tracks behind the pivot member and is configured to maintain alignment by pivoting about the pivot member at one or more pivot portions. In a yet further aspect, the roller assembly pivots about the pivot member at the first pivot portion. In an even further aspect, the assembly roller pivots about the pivot member at the second pivot portion. In a still further aspect, the assembly roller is configured to pivot 360 degrees about the pivot member, and can, in various aspects, still allow for full function and use of its design.

In a further aspect, the pivot member can be integrally or mechanically attached to at least a portion of the attachment frame or roller assembly. In a yet further aspect, the attachment frame comprises two support arms, wherein the first ends are connected to the first pivot portion, and wherein the second ends are configured to detachably connect to a first and second front portions of the powered machine. In a still further aspect, the second end of the support arm can be integrally or mechanically attached to the powered machine. In an even further aspect, the second end of the support arm can be detachably connected to the securement device.

In various aspects, the attachment frame can further comprise a connecting means. In a further aspect, the connecting means can be attached to the second end of the support arm. In a still further aspect, connecting means can comprise an adapter, fitting, insert, pin, adhesive, brazing, soldering, welding, spot weld, fastener, screw with nut, bolt with nut, rivet, threading, friction fit, snap-fit, twist-lock, interlocking mechanism, clamp, ball and socket, or a combination thereof.

In a further aspect, the second end of the support arm can further comprise a third pivot portion. In a yet further aspect, the third pivot portion can be rotatably connected to a portion of the powered machine by a pivot member. In a still further aspect, at least one pivot portion comprises an aperture or port for receiving a pivot member. In an even further aspect, the first and second pivot portions comprise an aperture or port for receiving a pivot member.

In various aspects, at least one pivot portion further comprises a pivoting means. In a further aspect, the pivoting means is configured to pivot a component attached to the pivot portion around a pivot axis. In a still further aspect, the pivot portion can define a pivot axis. In some aspects, the pivot axis is parallel to the pivot portion. In other aspects, the pivot axis is perpendicular to the pivot portion. In a further aspect, the first pivot portion can be rotatably connected to the second pivot portion by extending the pivot member through a first aperture from a first side of the first pivot portion to a second side of the first pivot portion, and by extending the pivot pin through a second aperture from a first side of the second pivot portion to a second side of the second pivot portion.

In a further aspect, the first pivot portion can comprise a pivoting means configured to rotate the roller assembly around a pivot axis. In a still further aspect, the second pivot portion can comprise a pivoting means configured to pivot the roller assembly around a pivot axis. In a yet further aspect, the first pivot portion can comprise a first pivoting means configured to rotate the roller assembly around a first pivot axis, and the second pivot portion comprises a second pivoting means configured to pivot the roller assembly around a second pivot axis.

In a further aspect, the pivot axis can be parallel to a movement direction. In a still further aspect, the pivot axis is parallel to a movement direction and corresponds with a contact point between the roller component and a surface elevation of a medium thereby positioning the pivot axis correspondingly to the surface elevation at the point of contact. In a yet further aspect, the pivot axis is parallel to a movement direction; and the roller device is configured to maintain the pivot axis substantially aligned with a vertical plane parallel to the movement direction and substantially corresponding with a contact point between the roller component and a surface upon which the roller component is supported. In a still further aspect, the pivot axis can substantially remain at a fixed point relative to the roller component as the pivoting means rotates about its axis. In an even further aspect, the second pivot point can be positioned below the first pivot point; and thereby allowing the roller device to contour to a surface elevation of a medium being compressed independent of the position of the powered machine in relationship to the contour of the surface medium.

In further aspects, the roller device can be configured to pivot around the third pivot point. In a still further aspect, the roller device can be configured to pivot up and down around the third pivot point. In a yet further aspect, the third pivot portion is configured to allow the roller device to contour to the surface elevation of a medium being compressed, independent of the position of the powered machine in relationship to the contour of the surface medium. In an even further aspect, attachment frame and roller assembly are connected, the support arms are oriented to the ground at an angle of from about 15 to about 75 degrees. In a still further aspect, the support arms exhibit from about 15 to about 75 degrees of movement.

In a further aspect, the pivot member comprises a pin, shaft, rod, axle spindle, or spindle bearing, or bushing, for example sacrificial or non-sacrificial type. In a still further aspect, the pivoting means comprises a bearing, or low friction connection device. In a yet further aspect, the bearing can comprise a ball bearing, spindle bearing, or bushing, for example sacrificial or non-sacrificial type. In an even further aspect, the rotating means can comprise a shaft, an axle, a bearing, or bushing, for example sacrificial or non-sacrificial type.

In a further aspect, the roller frame ends can be connected to the roller component using axle bearings. In a still further aspect, the rotating means comprises a shaft having first and second ends, where the first end of the roller frame is connected to a first end of the shaft, the second end of roller frame is connected to the second end of the shaft. In a yet further aspect, the shaft can be fixedly connected to the roller frame ends through apertures in the roller frame ends and secured by pins, for example, so the roller axle remains held in place of the roller frame.

In various aspects, the roller component has a substantially cylindrical body. In a further aspect, the roller component has a substantially cylindrical body and convex shaped ends, for example, to reduce cutting or creating roller edge marks into the media being rolled across. In a still further aspect, the roller component is a weighted cylinder, drum, tank, or the like. In a yet further aspect, the roller component is comprised of any material capable of holding a weighted substance within the roller component while maintaining rigidity during rotational operation. In a still further aspect, the roller component is comprised of a heavily weighted material. In an even further aspect, the roller component is comprised of metal or non-metal, magnetic or non-magnetic, including, but not limited to resin fiber, steel, aluminum or a metal alloy, plastic, polymer, or a combination thereof.

In a further aspect, the roller component comprises an aperture of circular cross section extending axially through the roller component for being placed in mating relation with the shaft. In a still further aspect, the roller component is disposed over the shaft for rotation around the shaft. In a yet further aspect, an axis on which the roller component rotates is spaced apart behind from a vertical axis of the pivot member on which the roller support turns; and wherein the roller component follows behind the pivot portion of the attachment frame.

In further aspects, the disclosed devices and systems can comprise a plurality of roller components, for example, two or more roller components. In some aspects, the plurality of roller components can be disposed over the same rotating means or axle. In other aspects, the plurality of roller components can be disposed different rotating means or axle. In still further aspects, each roller component can independently rotate about the rotating means from the other roller components of the plurality of roller components.

In various aspects, the device can further comprise a powered machine connected to the attachment frame. In a further aspect, the powered machine can comprise any motor driven machine that can support the weight of and pull the roller device. In a still further aspect, the powered machine comprises a lawn maintenance machine, walk behind mower, riding mower, tractor, skid-steer, motor driven vehicle, all-terrain vehicle (ATV), or utility task vehicle (UTV), or powered track type machine.

In various aspects, the roller assembly can be configured to be self-guided in a desired path in front of the powered machine. In a further aspect, the roller assembly has full 360-degree rotational capability while being driven from behind by the powered machine, yet allowing the roller assembly to be pulled forward from behind. In a still further aspect, the roller assembly can track behind the pivot portion and is configured to adjust its own path effectively while being propelled through a turn. In a yet further aspect, the device can be configured to reach corners or other confined areas out of reach in normal turning. In an even further aspect, the device is configured to adjust and select any desired turning radius. In a still further aspect, the device is not dependent upon the turning radius of the powered machine to which it is attached.

In various further aspects, the device is configured to be backed up and propelled back and forth as required. In a still further aspect, the device is configured to be backed up and propelled back and forth at an angle from 0 to 360 degrees while still allowing full use and the forward pulling operational path. In yet further aspects, the angle can comprise from about 5 to about 65 degrees, or from about 15 to about 45 degrees, or any combination of degrees with the exemplified ranges.

In a further aspect, the device is configured to compress a medium. In a still further aspect, the medium is the ground, earth, dirt, grass, gravel, rock, sand or a combination thereof. In a yet further aspect, the device is configured to eradicate the surface disturbances of unevenness, ridges and other unwanted surface conditions, for example, those created as a result of the burring rodents located in a tunnel beneath the surface of the ground by compressing the ground. In a yet further aspect, the device is configured to erase, through compression, the tunnel ridges created by ground burrowing rodents, for example, by restoring the surface elevation of the tunnel raised ground to that of the adjacent undisturbed ground/lawn surface.

In other aspects, the present disclosure also provides methods of using the disclosed devices and systems. In one aspect, disclosed herein is a method for compressing a medium, the method comprising: providing a disclosed roller device or system and contacting a medium with the roller component to thereby compress the medium.

In various further aspects, the disclosed roller devices and systems can be used to prepare media through compression to a level compressed surface in preparation for installation of grass sod, gravel, stone or sand. In other aspects, also disclosed is a method of eradicating underground burrowing rodents via ground compression and/or suffocation.

In a further aspect, the methods can further comprise eliminating tunnels created by the burrowing rodent, for example, after a suffocation treatment or procedure. In a still further aspect, the methods can provide a property owner of the property a visible way to monitor for continued burrowing rodent activity, for example, after compression treatment and/or suffocation treatment. In a yet further aspect, the suffocation treatment can be performed using sufficant generation machines which create and displace the underground atmosphere with a sufficant, for example, a toxic vapor or proprietary vapor.

In further aspects, the disclosed roller devices and systems can be used for ground compression prior to grass sod installation, gravel compression as a base, and other lawn care applications.

According to various further aspects of the invention, the roller devices and systems can comprise multiple configurations. For example, various exemplary embodiments of the inventive roller devices and systems are shown in FIGS. 1-17.

Figure 2:
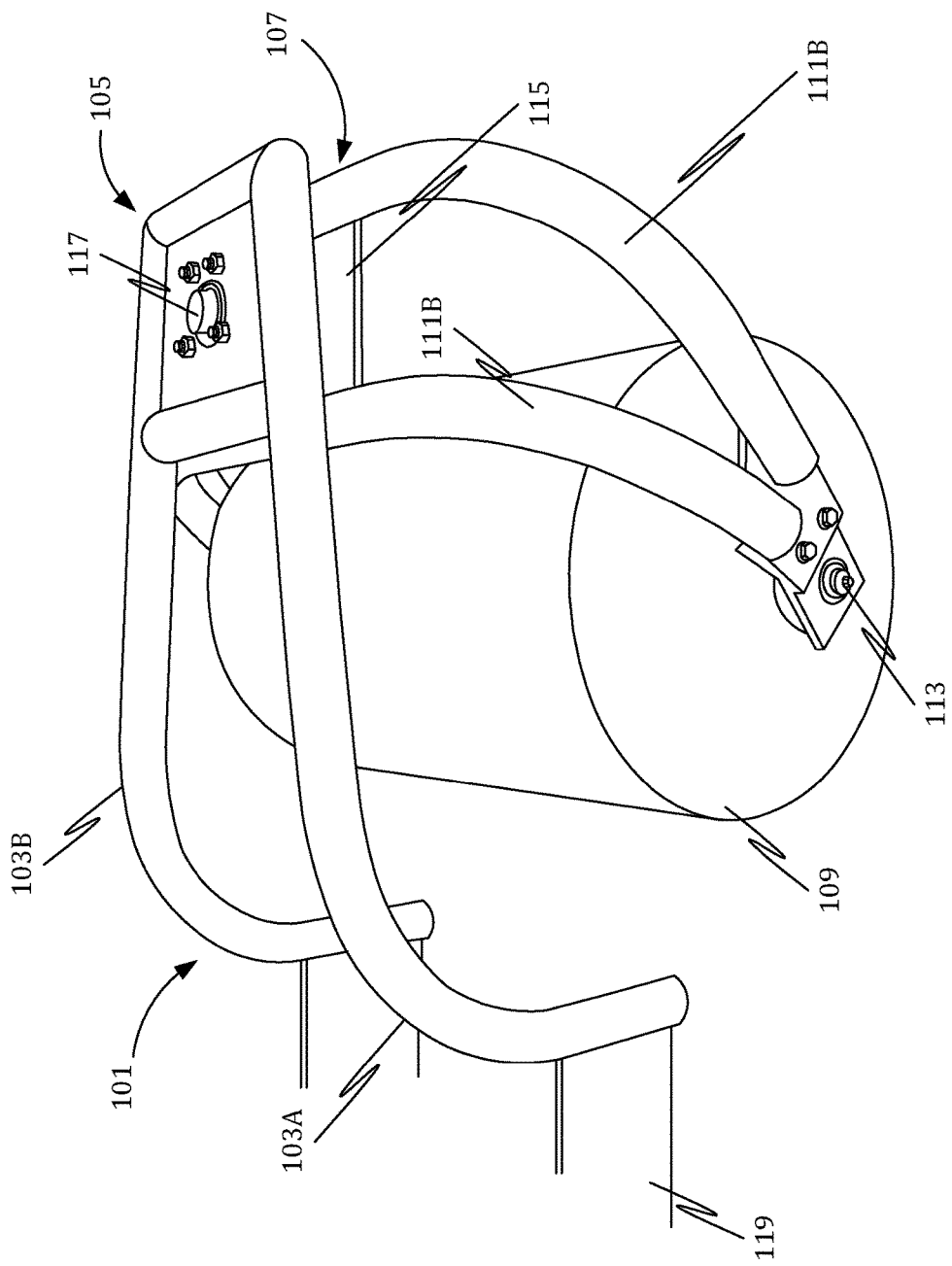
FIG. 2 shows a depiction of a roller device for attachment to a powered machine in accordance with an exemplary embodiment of the present invention.
Figure 3:
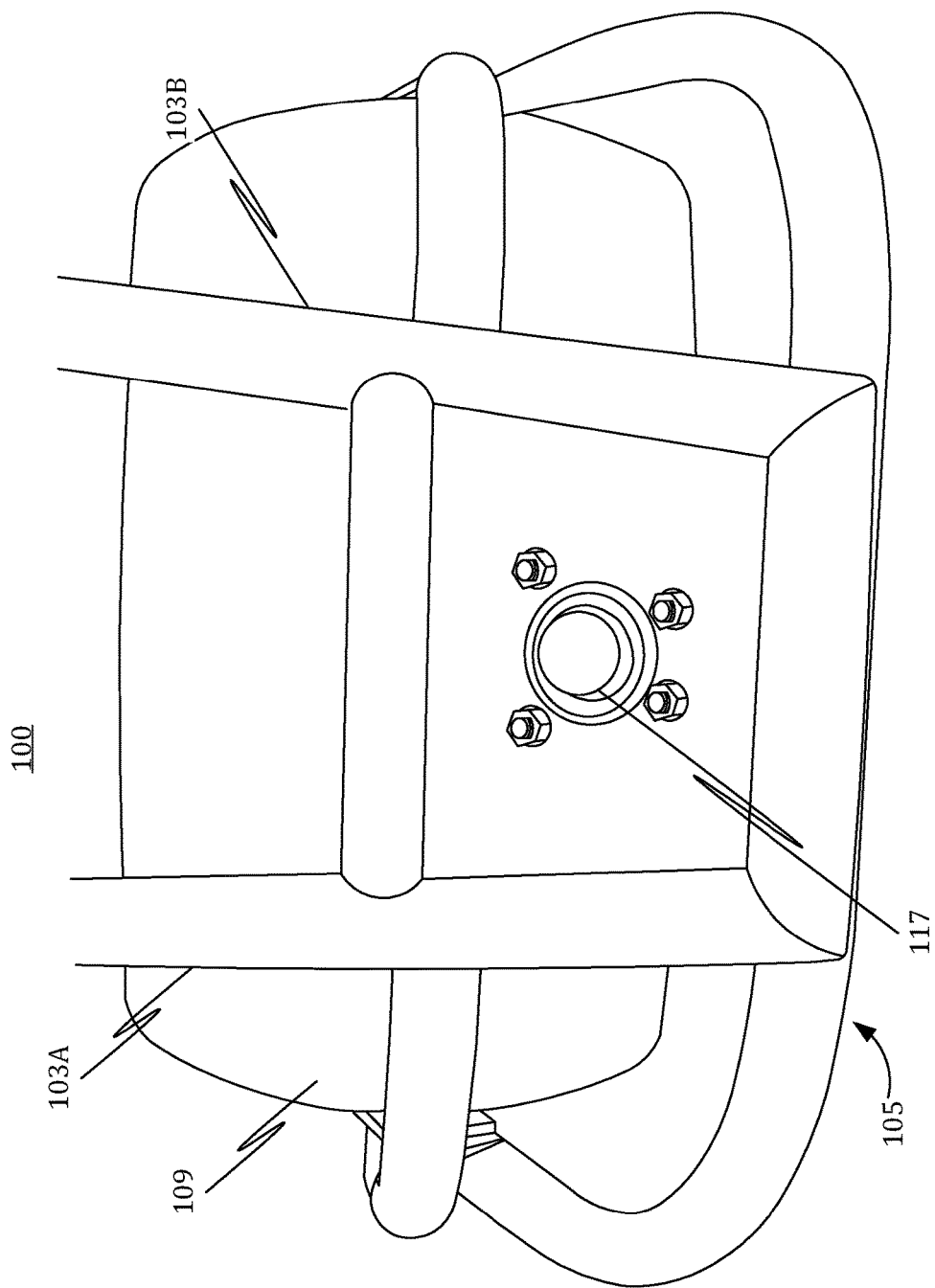
FIG. 3 shows a depiction of a roller device for attachment to a powered machine in accordance with an exemplary embodiment of the present invention.

In various aspects, FIGS. 1-3 show an exemplary roller device 100 for attachment to a walk behind powered tractor. In these embodiments, the roller device 100 comprises: an attachment frame configured to connect to a powered machine, the attachment frame 101 comprising first and second support arms 103a, 103b, each having first and second opposed ends, the first end having a first pivot portion 105 configured to receive a pivot member, and the second end being configured to connect to a portion of the powered machine; a roller assembly 107 comprising: a rotatable roller component 109; first and second roller frames 111a, 111b, each having first and second ends, the first end being rotatably connected to a first end of the roller component 109 with a rotating means 113 configured to allow rotation of the roller component, the second end being rotatably connected to a second end of the roller component 109 using the rotating means 113 configured to allow rotation of the roller component, and the roller frames having a second pivot portion 115 being configured to connect to the first pivot portion 105. As shown in FIG. 2, the first ends of the support arms 103a, 103b are connected to the first pivot portion, and the second ends 119 are configured to detachably connect to front portions of a powered machine. As shown in FIG. 3, a pivot member 117 in the form of a spindle axle connects the first and second pivot portions.

Figure 4:
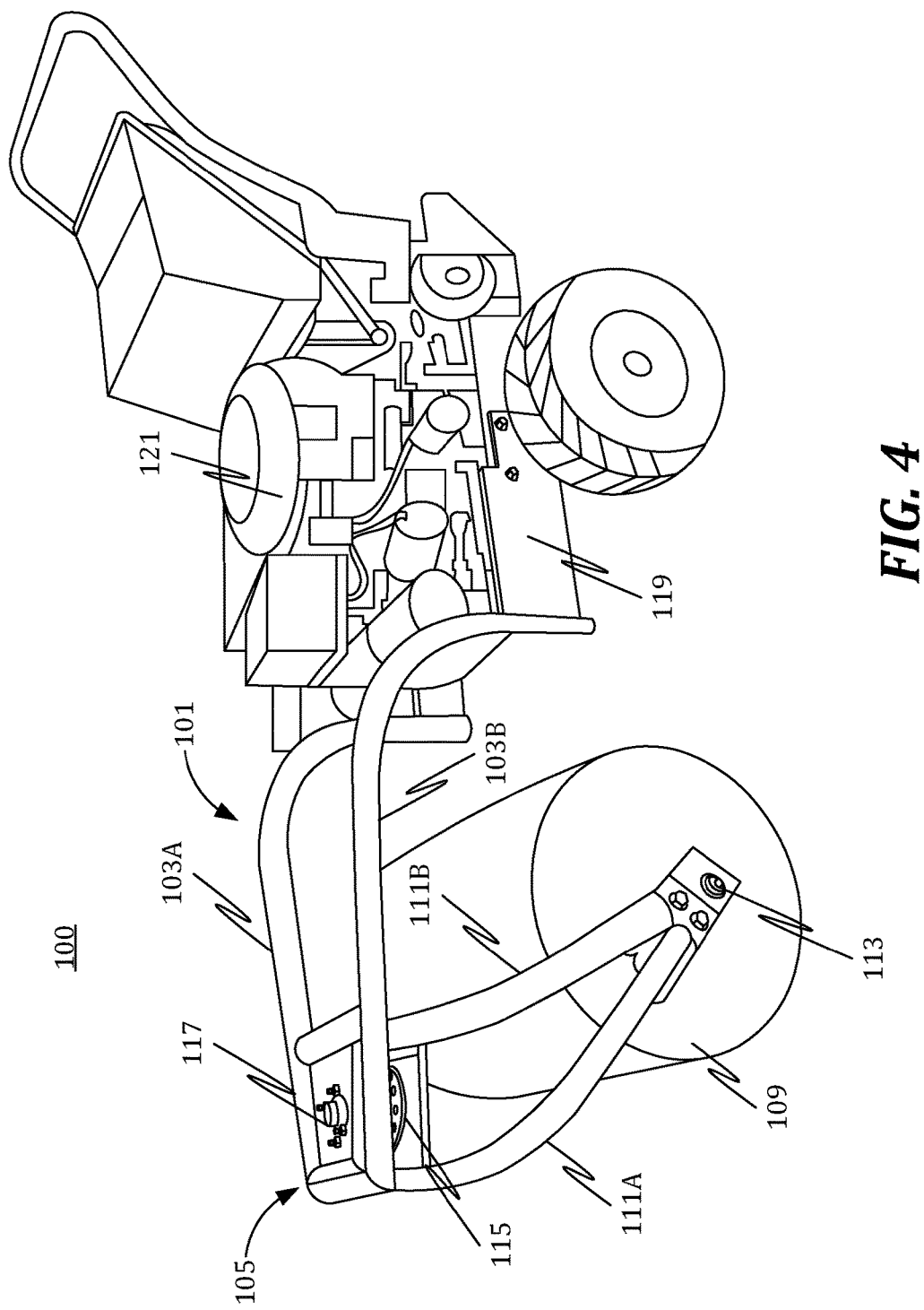
FIG. 4 shows a depiction of a roller device connected to a powered machine in accordance with an exemplary embodiment of the present invention.
Figure 5:
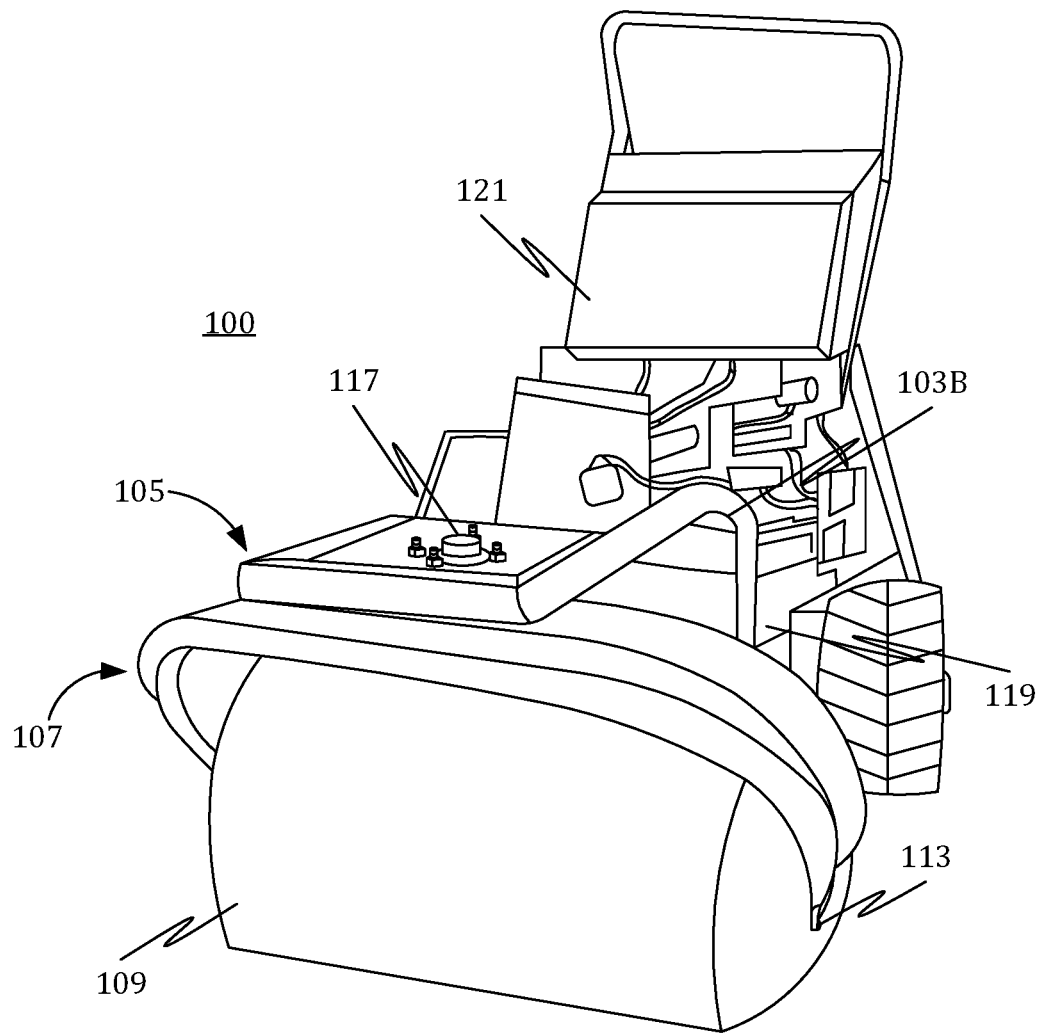
FIG. 5 shows a depiction of operation of a roller device connected to a powered machine in accordance with an exemplary embodiment of the present invention.
Figure 6:
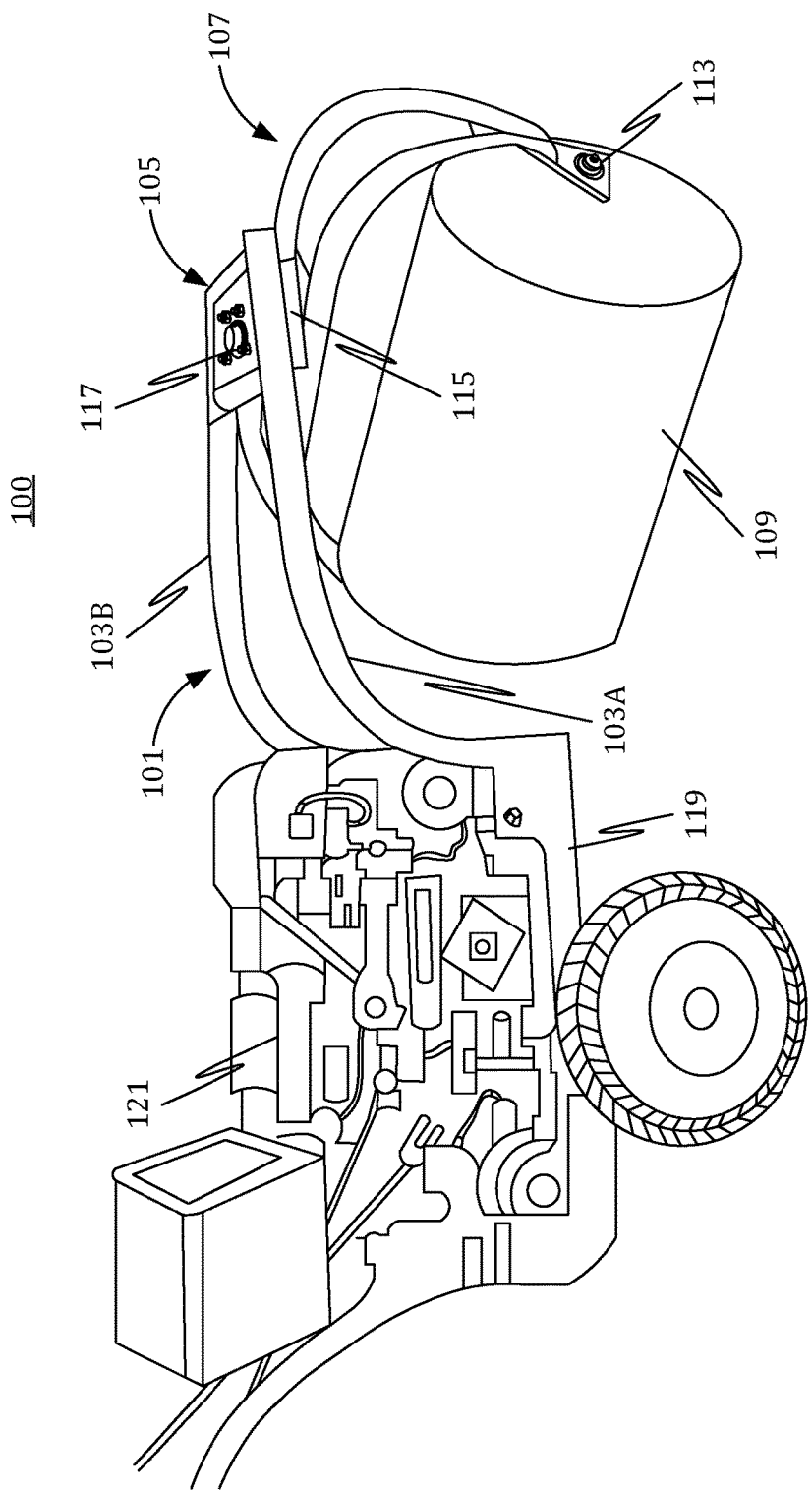
FIG. 6 shows a depiction of operation of a roller device connected to a powered machine in accordance with an exemplary embodiment of the present invention.
Figure 7:
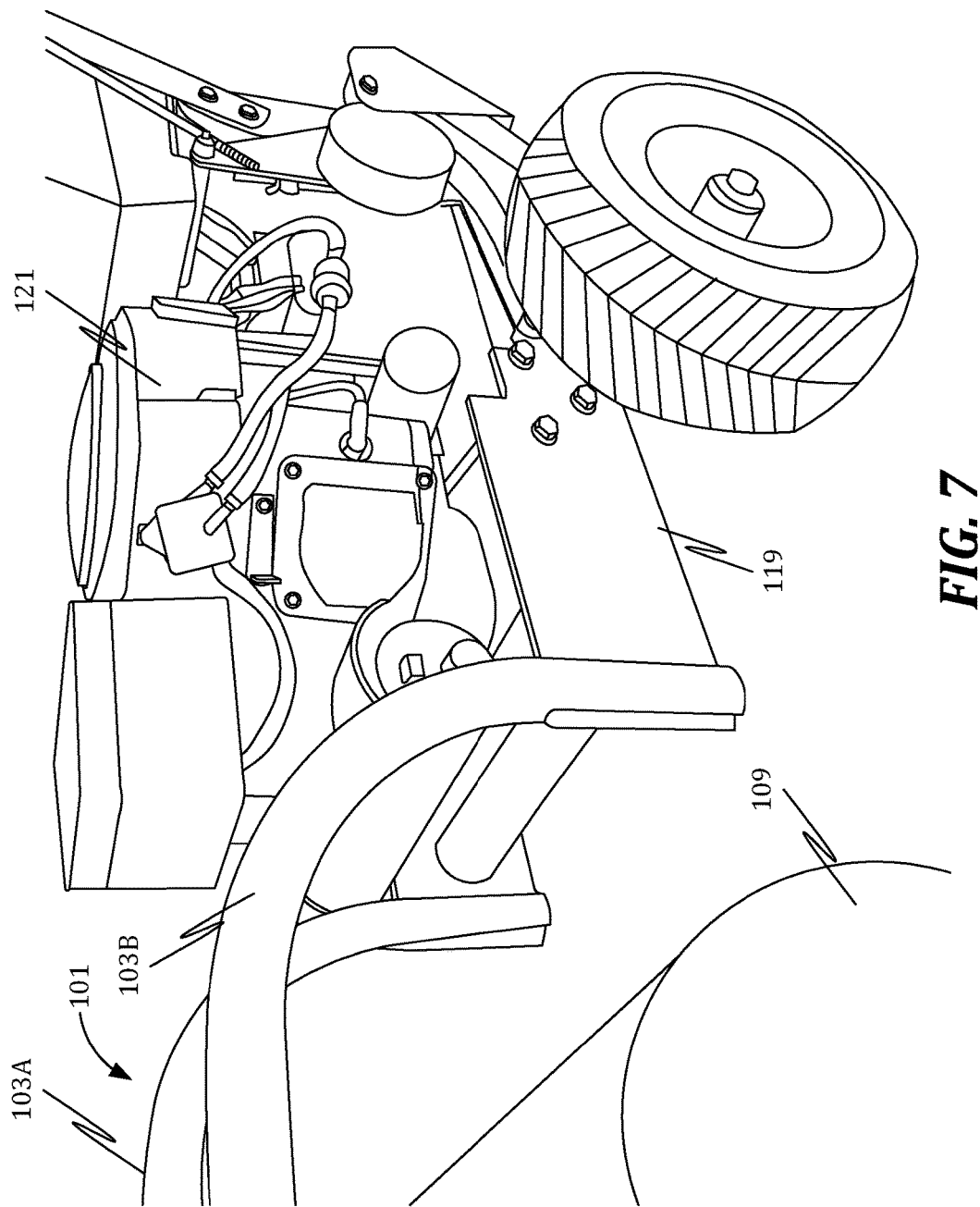
FIG. 7 shows a depiction of a roller device for connected to a powered machine in accordance with an exemplary embodiment of the present invention.

Additionally, as shown in FIGS. 4-7, the roller device can be attached to the front portion of a powered machine 121, shown in the form of a walk behind powered mower or tractor. As shown in FIGS. 4-6, the roller assembly can rotate about the attachment frame, and is configured to be pulled forward in a desired path upon forward movement of the attached powered machine.

Figure 8:
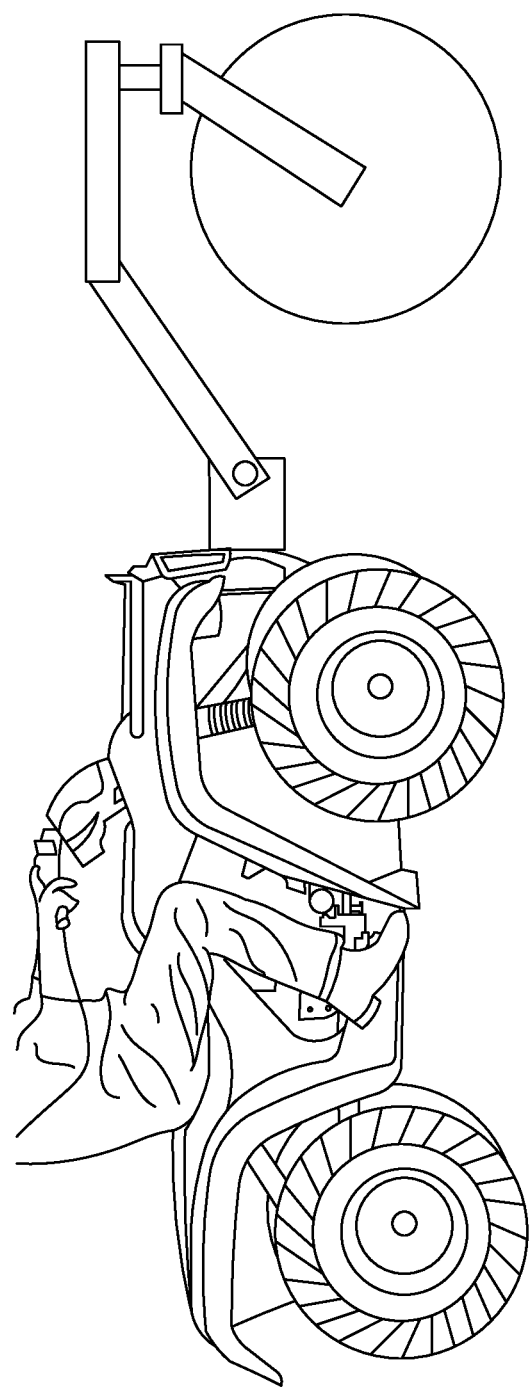
FIG. 8 shows a depiction of a roller device connected to an all-terrain vehicle (ATV) in accordance with an exemplary embodiment of the present invention.
Figure 9:
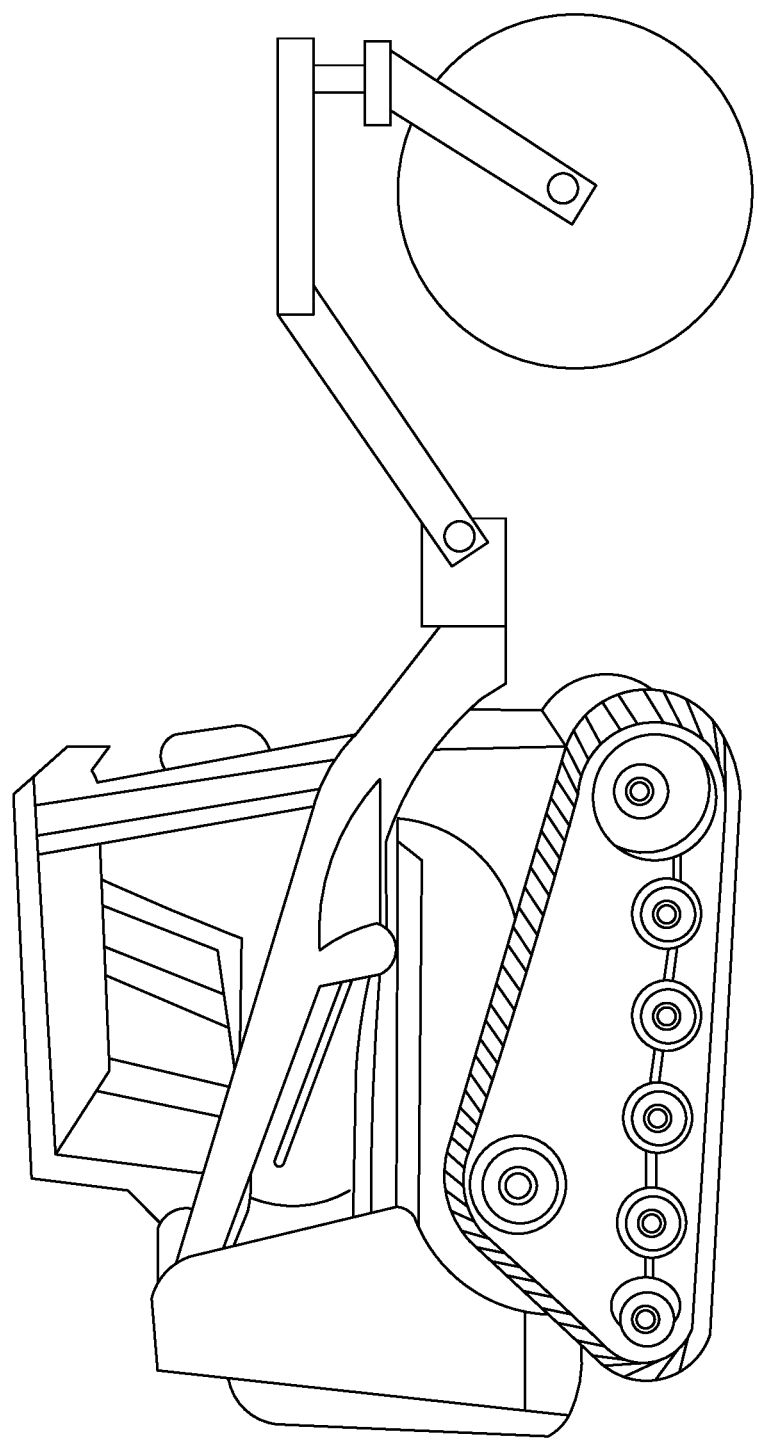
FIG. 9 shows a depiction of a roller device connected to a skidsteer in accordance with an exemplary embodiment of the present invention.
Figure 10:
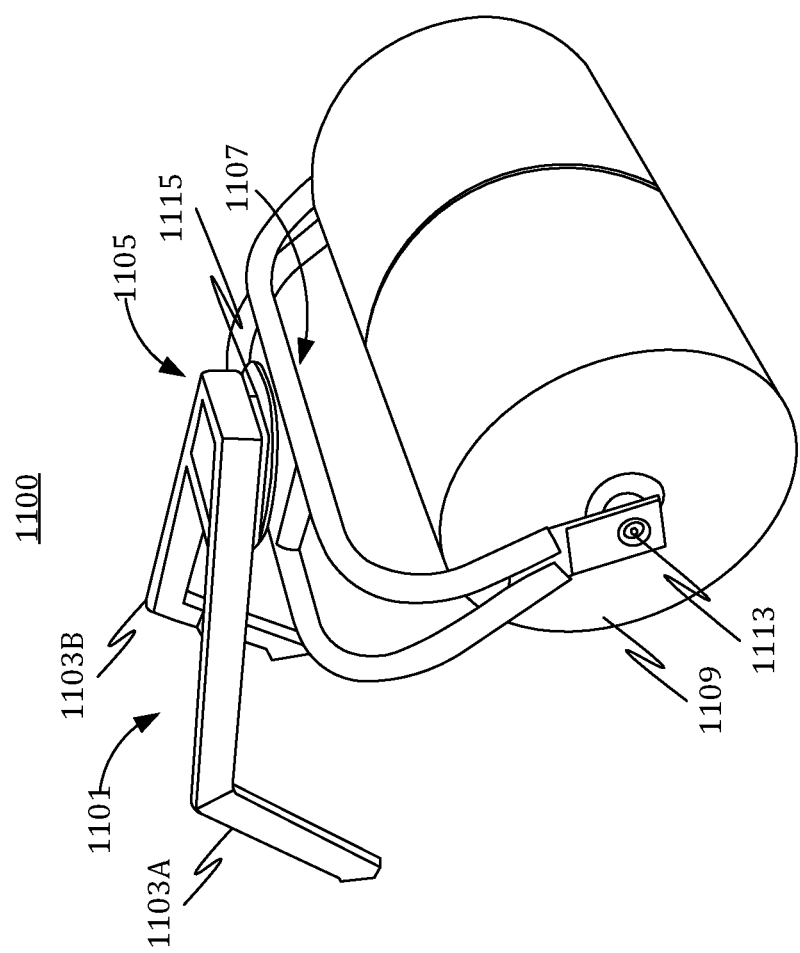
FIG. 10 shows a depiction of a roller device for attachment to a powered machine in accordance with an exemplary embodiment of the present invention.
Figure 11:
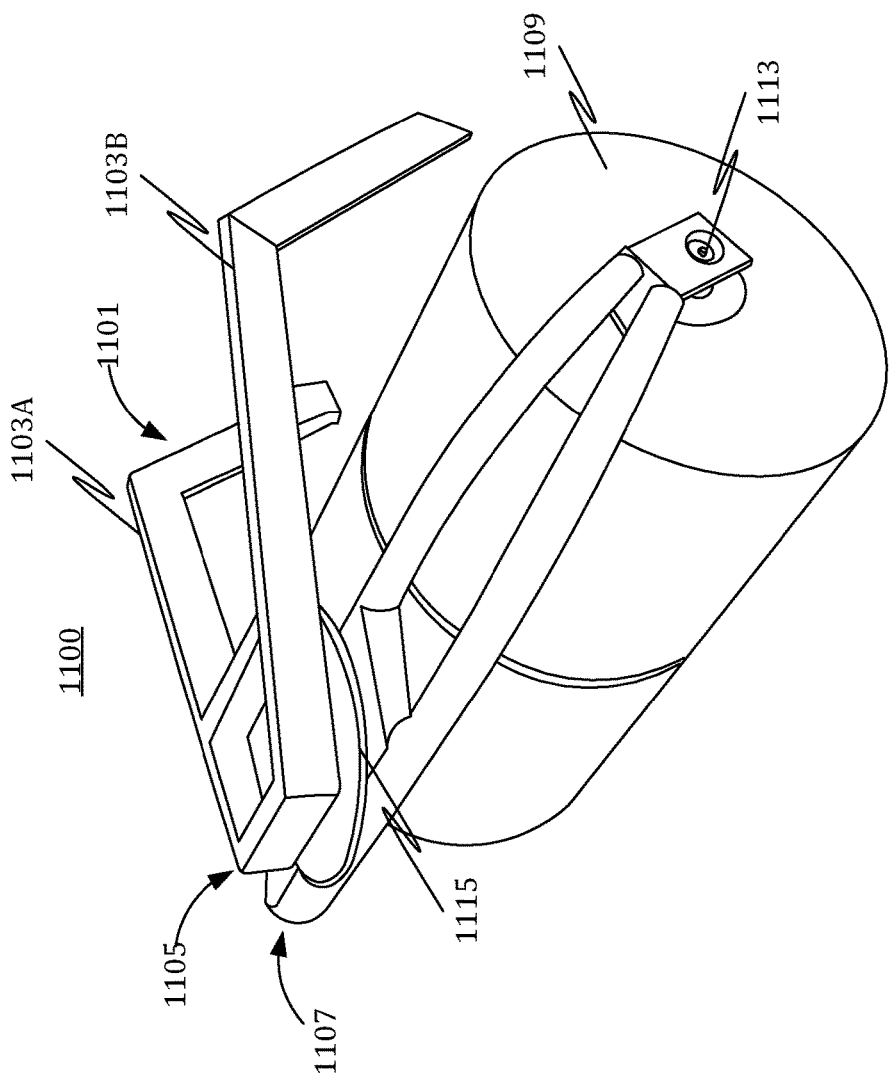
FIG. 11 shows a depiction of a roller device for attachment to a powered machine in accordance with an exemplary embodiment of the present invention.

In various further aspects, FIGS. 8 and 9 show additional exemplary roller devices attached to different types of powered machines. As shown in FIG. 8, the roller device can be attached to an all-terrain vehicle (ATV). FIG. 9 shows another embodiment of the roller device attached to a skidsteer. In further aspects, the second end of the support arm can further comprises a third pivot portion, and the third pivot portion can be rotatably connected to the portion of the powered machine by a pivot member. The first and second pivot portions can be connected by the pivot member, and the roller assembly can rotate about the attachment frame. The third pivot portion can be configured to allow the roller device to contour to a surface elevation of a medium being compressed, independent of the position of the powered machine in relationship to the contour of the surface medium.

Figure 12:
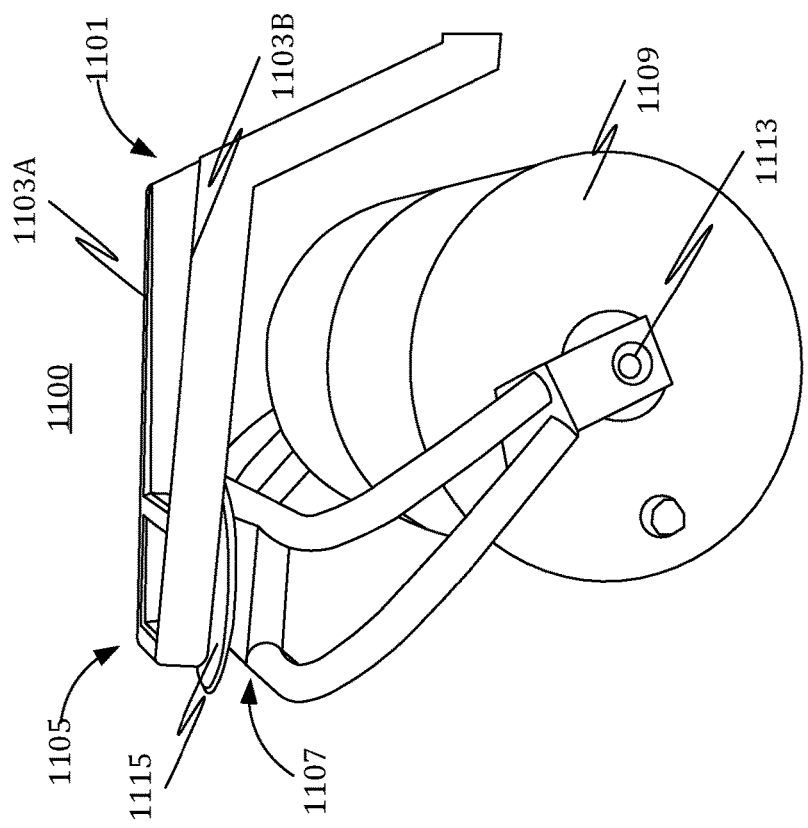
FIG. 12 shows a depiction of a roller device for attachment to a powered machine in accordance with an exemplary embodiment of the present invention.
Figure 13:
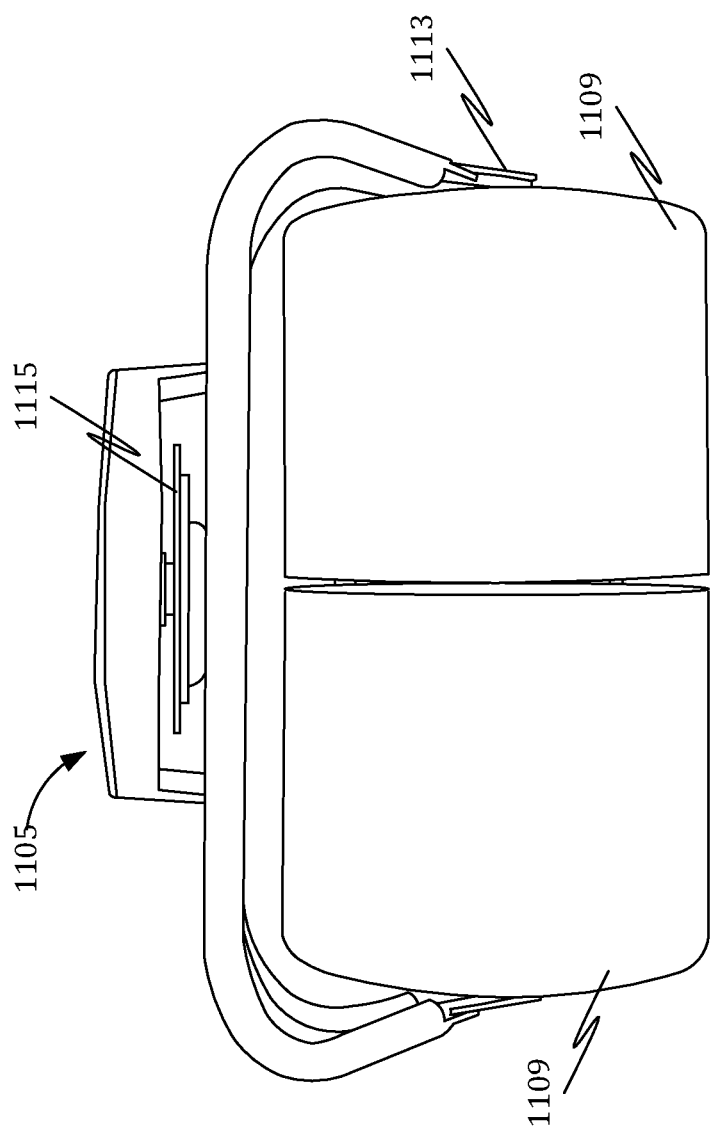
FIG. 13 shows a depiction of a roller device for attachment to a powered machine in accordance with an exemplary embodiment of the present invention.

In further aspects, FIGS. 10-13 show another exemplary roller device 1100 configured to attach to a riding powered mower. In these embodiments, the roller device 1100 comprises: an attachment frame 1101 comprising first and second support arms 1103a, 1103b, each having first and second opposed ends, the first end having a first pivot portion 1105, and the second end being configured to connect to a portion of the powered machine; a roller assembly 1107 comprising: a plurality of rotatable roller component 1109; first and second roller frames, each having first and second ends, each end being rotatably connected to an end of a roller component 1109 with an axle 1113 configured to allow rotation of the roller component. The roller frames have a second pivot portion 1115 configured to connect to the first pivot portion 1105. As shown in FIG. 12, the first ends of the support arms 1103a, 1103b are connected to the first pivot portion, and the second ends are configured to detachably connect to a portion of a powered machine. As shown in FIG. 13, a pivot member 1117 connects the first and second pivot portions.

Figure 14:
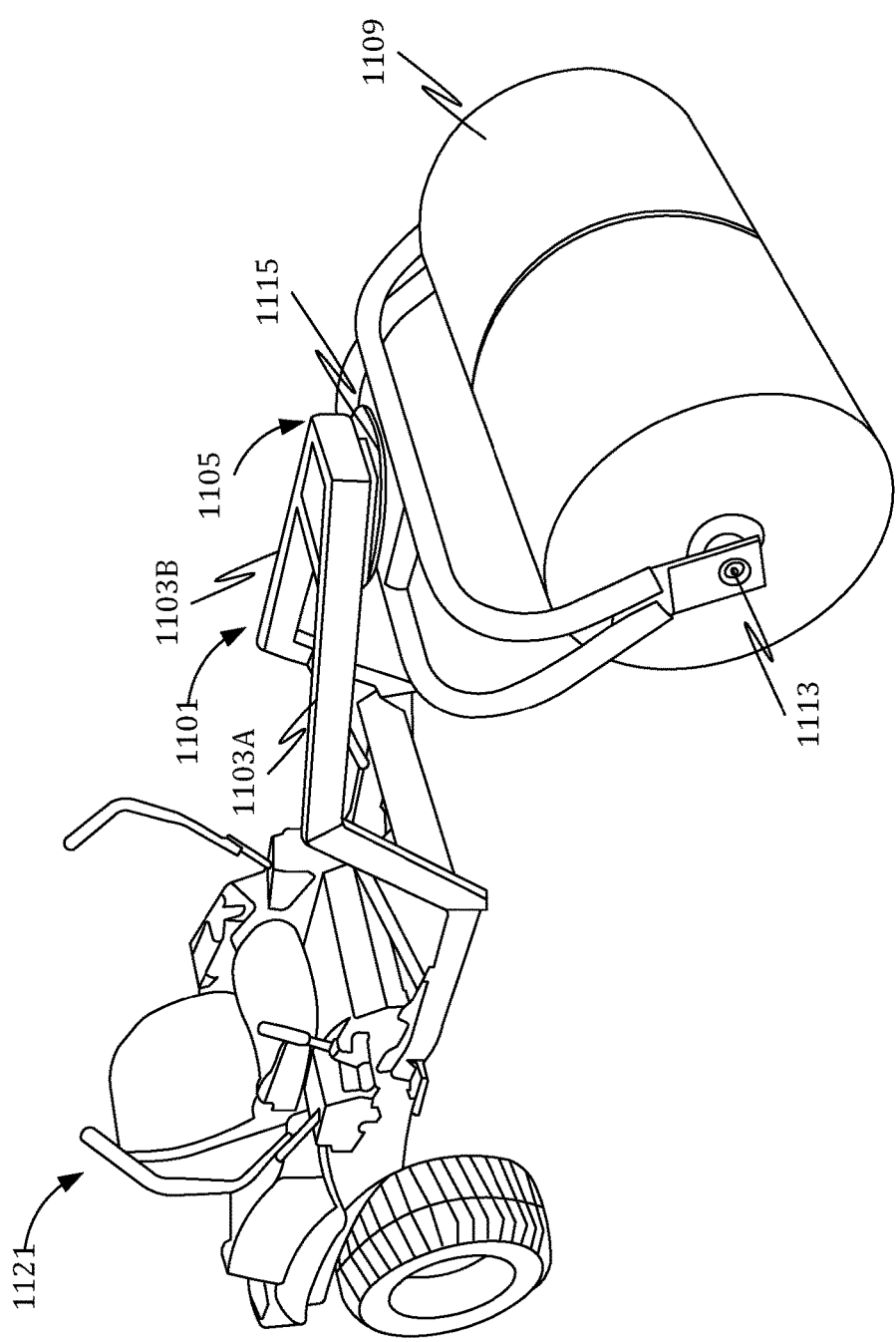
FIG. 14 shows a depiction of a roller device connected to a powered machine in accordance with an exemplary embodiment of the present invention.
Figure 15:
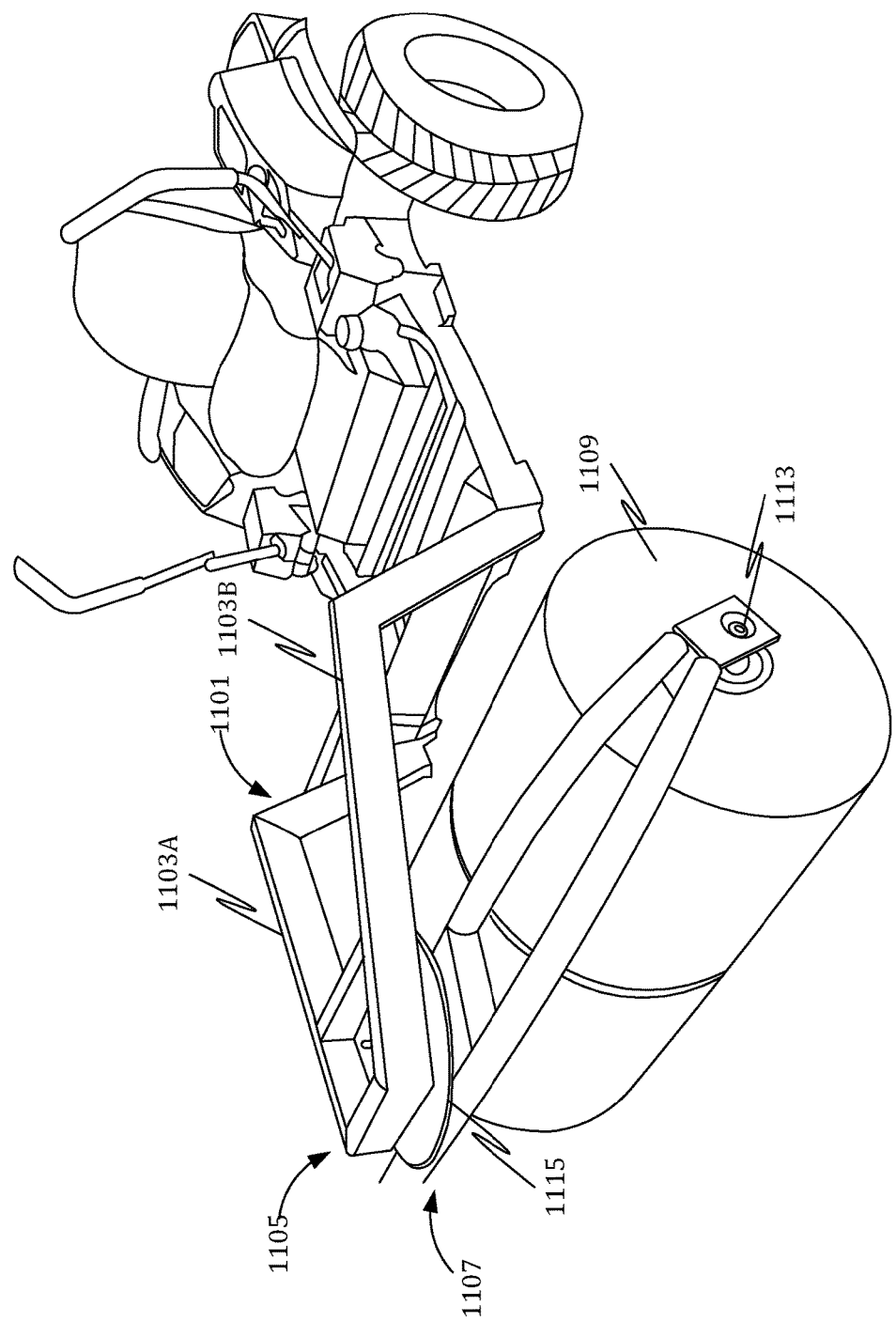
FIG. 15 shows a depiction of a roller device connected to a powered machine in accordance with an exemplary embodiment of the present invention.
Figure 16:
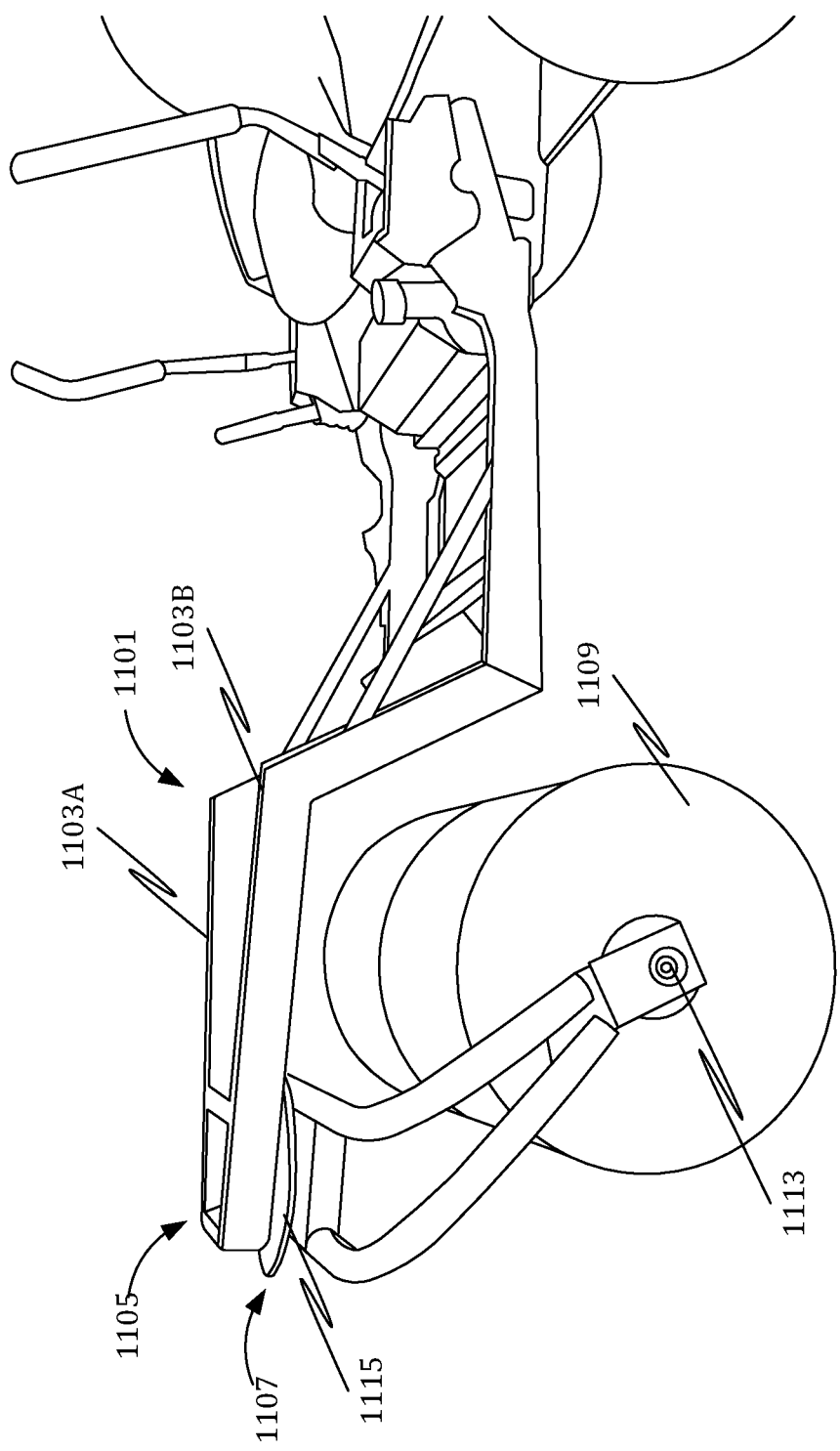
FIG. 16 shows a depiction of a roller device connected to a powered machine in accordance with an exemplary embodiment of the present invention.
Figure 17:
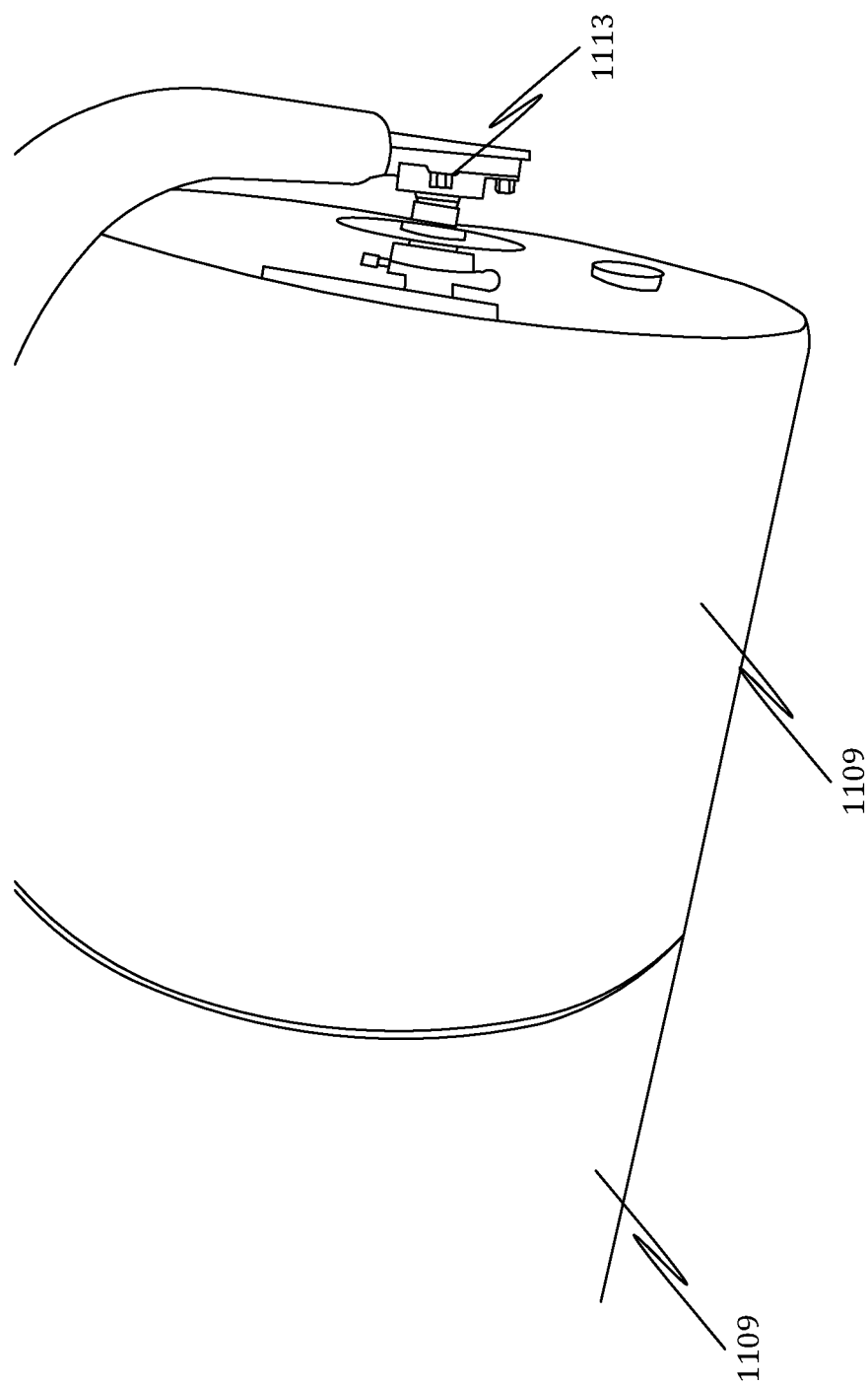
FIG. 17 shows a depiction of a roller device in accordance with an exemplary embodiment of the present invention.

Additionally, as shown in FIGS. 14-16, the roller device 1100 can be attached to the front portion of a powered machine 1121, shown in the form of a riding powered mower. As shown in FIGS. 14-16, the roller assembly can rotate about the attachment frame, and is configured to be pulled forward in a desired path upon forward movement of the attached powered machine. As shown in FIG. 17, the plurality of roller components 1109 are disposed over the same rotating means 1113. In some aspects, the plurality of roller components may be disposed over different rotating means or axles. In still further aspects, each roller component can independently rotate about the rotating means from the other roller component during operation.

The present invention includes at least the following aspects:

Aspect 1: A roller device for attachment to a powered machine, the roller device comprising: a) an attachment frame configured to connect to a powered machine, the attachment frame comprising: i) at least one support arm having first and second opposed ends, the first end having a first pivot portion configured to receive a pivot member, and the second end being configured to connect to a portion of the powered machine; b) a roller assembly comprising: i) at least one rotatable roller component; ii) at least one roller frame having first and second ends, the first end being rotatably connected to a first end of the roller component with a rotating means configured to allow rotation of the roller component, the second end being rotatably connected to a second end of the roller component using a rotating means configured to allow rotation of the roller component, and the roller frame having a second pivot portion being configured to connect to the first pivot portion; and c) a pivot member configured to connect the first and second pivot portions; wherein when the first and second pivot portions are connected by the pivot member, the roller assembly can rotate about the attachment frame; wherein when the roller device is attached to a front portion of the powered machine, the roller assembly is configured to be pulled forward in a desired path upon forward movement of an attached powered machine; and wherein when the roller device is attached to a rear portion of the powered machine, the roller assembly is configured to be pulled forward in a desired path upon forward movement of an attached powered machine.

Aspect 2: The device of aspect 1, wherein when the first and second pivot portions are connected by the pivot member; and wherein the roller assembly tracks behind the pivot member and is configured to maintain alignment by pivoting about the pivot member at one or more pivot portions.

Aspect 3: The device of aspects 1-2, wherein the roller assembly pivots about the pivot member at the first pivot portion.

Aspect 4: The device of aspects 1-3, wherein the assembly roller pivots about the pivot member at the second pivot portion.

Aspect 5: The device of aspects 1-4, wherein the assembly roller is configured to pivot 360 degrees about the pivot member while still allowing for full function and use of its design.

Aspect 6: The device of aspects 1-5, wherein the pivot member is integrally or mechanically attached to at least a portion of the attachment frame or roller assembly.

Aspect 7: The device of aspects 1-6, wherein the attachment frame comprises two support arms, wherein the first ends are connected to the first pivot portion, and wherein the second ends are configured to detachably connect to a first and second front portions of the powered machine.

Aspect 8: The device of aspects 1-7, wherein the second end of the support arm is integrally or mechanically attached to the powered machine.

Aspect 9: The device of aspect 1-8, wherein the second end of the support arm is detachably connected to the securement device.

Aspect 10: The device of aspects 1-9, wherein the attachment frame further comprises a connecting means.

Aspect 11: The device of aspect 1-10, wherein the connecting means are attached to the second end of the support arm.

Aspect 12: The device of aspects 1-11, wherein the connecting means comprises an adapter, fitting, insert, pin, adhesive, brazing, soldering, welding, spot weld, screw with nut, rivet, threading, friction fit, snap-fit, twist-lock, interlocking mechanism, clamp, ball and socket, or a combination thereof.

Aspect 13: The device of aspects 1-12, wherein the second end of the support arm further comprises a third pivot portion.

Aspect 14: The device of aspects 1-13, wherein the third pivot portion is rotatably connected to a portion of the powered machine by a pivot member.

Aspect 15: The device of aspects 1-14, wherein at least one pivot portion comprises an aperture or port for receiving a pivot member.

Aspect 16: The device of aspects 1-15, wherein the first and second pivot portions comprise an aperture or port for receiving a pivot member.

Aspect 17: The device of aspects 1-16, wherein at least one pivot portion further comprises a pivoting means.

Aspect 18: The device of aspects 1-17, wherein the pivoting means is configured to pivot a component attached to the pivot portion around a pivot axis.

Aspect 19: The device of aspects 1-18, wherein the pivot portion defines the pivot axis.

Aspect 20: The device of aspects 1-19, wherein the pivot axis is parallel to the pivot portion.

Aspect 21: The device of aspects 1-20, wherein the pivot axis is perpendicular to the pivot portion.

Aspect 22: The device of aspects 1-21, wherein the first pivot portion is rotatably connected to the second pivot portion by extending the pivot member through a first aperture from a first side of the first pivot portion to a second side of the first pivot portion, and by extending the pivot pin through a second aperture from a first side of the second pivot portion to a second side of the second pivot portion.

Aspect 23: The device of aspects 1-22, wherein the first pivot portion comprises a pivoting means configured to rotate the roller assembly around a pivot axis.

Aspect 24: The device of aspects 1-23, wherein the second pivot portion comprises a pivoting means configured to pivot the roller assembly around a pivot axis.

Aspect 25: The device of aspects 1-24, wherein the first pivot portion comprises a first pivoting means configured to rotate the roller assembly around a first pivot axis, and the second pivot portion comprises a second pivoting means configured to pivot the roller assembly around a second pivot axis.

Aspect 26: The device of aspects 1-25, wherein the pivot axis is parallel to a movement direction.

Aspect 27: The device of aspects 1-26, wherein the pivot axis is parallel to a movement direction and corresponds with a contact point between the roller component and a surface elevation of a medium thereby positioning the pivot axis correspondingly to the surface elevation at the point of contact.

Aspect 28: The device of aspects 1-27, wherein the pivot axis is parallel to a movement direction; and wherein the roller device is configured to maintain the pivot axis substantially aligned with a vertical plane parallel to the movement direction and substantially corresponding with a contact point between the roller component and a surface upon which the roller component is supported; wherein the pivot axis will substantially remain at a fixed point relative to the roller component as the pivoting means rotates about its axis.

Aspect 29: The device of aspects 1-28, wherein the second pivot point is position below the first pivot point; and thereby allowing the roller device to contour to a surface elevation of a medium being compressed independent of the position of the powered machine in relationship to the contour of the surface medium.

Aspect 30: The device of aspects 1-29, wherein the roller device is configured to pivot around the third pivot point.

Aspect 31: The device of aspects 1-30, wherein the roller device is configured to pivot up and down around the third pivot point.

Aspect 32: The device of aspects 1-31, wherein the third pivot portion is configured to allow the roller device to contour to the surface elevation of a medium being compressed, independent of the position of the powered machine in relationship to the contour of the surface medium.

Aspect 33: The device of any preceding aspect, wherein when the attachment frame and roller assembly are connected, the support arms are oriented to the ground at an angle of from about 15 to about 75 degrees.

Aspect 34: The device of aspects 1-32, wherein the pivot member comprises a pin, shaft, rod, axle spindle, or spindle bearing, or bushing, or a combination thereof.

Aspect 35: The device of aspects 1-33, wherein the pivoting means comprises a bearing, or bushing, or a combination thereof.

Aspect 36: The device of aspects 1-34, wherein the bearing comprise as a ball bearing, spindle bearing, or bushing, or a combination thereof.

Aspect 37: The device of aspects 1-35, further comprising a powered machine connected to the attachment frame.

Aspect 38: The device of aspects 1-36, wherein the powered machine can comprise any motor driven machine that can support the weight of the roller device.

Aspect 39: The device of aspects 1-37, wherein the powered machine comprises a lawn maintenance machine, walk behind mower, riding mower, tractor, skid-steer, motor driven vehicle, all-terrain vehicle (ATV), or utility task vehicle (UTV), or powered track type machine.

Aspect 40: The device of aspects 1-39, wherein the rotating means comprises a shaft, an axle, a bearing, or bushing, or a combination thereof.

Aspect 41: The device of aspects 1-40, wherein the roller frame ends are connected to the roller component using axle bearings.

Aspect 42: The device of aspects 1-41, wherein the rotating means comprises a shaft having first and second ends, where the first end of the roller frame is connected to a first end of the shaft, the second end of roller frame is connected to the second end of the shaft.

Aspect 43: The device of aspects 1-42, wherein the shaft is fixedly connected to the roller frame ends through apertures in the roller frame ends and secured by pins.

Aspect 44: The device of aspects 1-43, wherein the roller component has a substantially cylindrical body.

Aspect 45: The device of aspects 1-44, wherein the roller component has a substantially cylindrical body and convex shaped ends.

Aspect 46: The device of aspects 1-45, wherein the roller component is a weighted cylinder, drum, or tank.

Aspect 47: The device of aspects 1-46, wherein the roller component is comprised of a heavily weighted material or any material capable of holding a weighted substance within the roller component while maintaining rigidity during rotational operation.

Aspect 48: The device of aspects 1-47, wherein the roller component is comprised of metal, non-metal, magnetic or non-magnetic, polymer, plastic, resin fiber, steel, aluminum or a metal alloy, or a combination thereof.

Aspect 49: The device of aspects 1-48, wherein the roller component comprises an aperture of circular cross section extending axially through the roller component for being placed in mating relation with the shaft.

Aspect 50: The device of aspects 1-49, wherein the roller component is disposed over the shaft for rotation around the shaft.

Aspect 51: The device of aspects 1-50, wherein an axis on which the roller component rotates is spaced apart behind from a vertical axis of the pivot member on which the roller support turns; and wherein the roller component follows behind the pivot portion of the attachment frame.

Aspect 52: The device of aspects 1-51, wherein the roller assembly is self-guided in a desired path in front of the powered machine.

Aspect 53: The device of aspects 1-52, wherein the roller assembly has full 360-degree rotational capability while being driven from behind by the powered machine, but yet allowing the roller assembly to be pulled forward from behind!

Aspect 54: The device of aspects 1-53, wherein the roller assembly tracks behind the pivot portion and is configured to adjust its own path effectively while being propelled through a turn.

Aspect 55: The device of aspects 1-54, wherein the device is configured to reach corners or other confined areas out of reach in normal turning.

Aspect 56: The device of aspects 1-55, wherein the device is configured to adjust and select any desired turning radius, and wherein It is not dependent upon the turning radius of the powered machine to which it is attached.

Aspect 57: The device of aspects 1-56, wherein the device is configured to be backed up and propelled back and forth as required.

Aspect 58: The device of aspects 1-57, wherein the device is configured to be backed up and propelled back and forth at an angle from 0 to 360 degrees while still allowing full use and the forward pulling operational path.

Aspect 59: The device of aspects 1-58, wherein the device is configured to compress a medium.

Aspect 60: The device of aspects 1-60, wherein the medium is the ground, earth, dirt, grass, gravel, stone, sand, cullet, volcanic based material, lunar based material, potash, slag, or mulch, or a combination thereof.

Aspect 61: The device of aspects 1-60, wherein the device is configured to eradicate ground moles located in a tunnel beneath the surface of the ground by compressing the ground and tunnel ridges, thereby returning the ground and surface contour/elevation to the same as adjacent media elevation.

Aspect 62: A ground compressing system for controlling burrowing rodents, the system comprising: a) a powered machine b) a roller device comprising: i) an attachment frame configured to connect to the powered machine, the attachment frame comprising: 1. at least one support arm having first and second opposed ends, the first end having a first pivot portion configured to receive a pivot member, and the second end being configured to connect to a portion of the powered machine; ii) a roller assembly comprising: 1. at least one rotatable roller component; 2. at least one roller frame having first and second ends, the first end being rotatably connected to a first end of the roller component with a rotating means configured to allow rotation of the roller component, the second end being rotatably connected to a second end of the roller component using a rotating means configured to allow rotation of the roller component, and the roller frame having a second pivot portion being configured to connect to the first pivot portion; and iii) a pivot member configured to connect the first and second pivot portions; wherein when the first and second pivot portions are connected by the pivot member, the roller assembly can rotate about the attachment frame; wherein when the roller device is attached to a front portion of the powered machine, the roller assembly is configured to be pulled forward in a desired path upon forward movement of an attached powered machine; and wherein when the roller device is attached to a rear portion of the powered machine, the roller assembly is configured to be pulled forward in a desired path upon forward movement of an attached powered machine.

Aspect 63: The system of aspect 62, wherein when the first and second pivot portions are connected by the pivot member; and wherein the roller assembly tracks behind the pivot member and is configured to maintain alignment by pivoting about the pivot member at one or more pivot portions.

Aspect 64: The system of aspects 62-63, wherein the roller assembly pivots about the pivot member at the first pivot portion.

Aspect 65: The system of aspects 62-64, wherein the assembly roller pivots about the pivot member at the second pivot portion.

Aspect 66: The system of aspects 62-65, wherein the assembly roller is configured to pivot 360 degrees about the pivot member and still allows for full function and use of its design.

Aspect 67: The system of aspects 62-66, wherein the pivot member is integrally or mechanically attached to at least a portion of the attachment frame or roller assembly.

Aspect 68: The system of aspects 62-67, wherein the attachment frame comprises two support arms, wherein the first ends are connected to the first pivot portion, and wherein the second ends are configured to detachably connect to a first and second front portions of the powered machine.

Aspect 69: The system of aspects 62-68, wherein the second end of the support arm is integrally or mechanically attached to the powered machine.

Aspect 70: The system of aspects 62-69, wherein the second end of the support arm is detachably connected to the securement device.

Aspect 71: The system of aspects 62-70, wherein the attachment frame further comprises a connecting means.

Aspect 72: The system of aspects 62-71, wherein the connecting means are attached to the second end of the support arm.

Aspect 73: The system of aspects 62-72, wherein the connecting means comprises an adapter, fitting, insert, pin, adhesive, brazing, soldering, welding, spot weld, screw with nut, rivet, threading, friction fit, snap-fit, twist-lock, or interlocking mechanism, clamp, ball and socket, or a combination thereof.

Aspect 74: The system of aspects 62-73, wherein the second end of the support arm further comprises a third pivot portion.

Aspect 75: The system of aspects 62-74, wherein the third pivot portion is rotatably connected to a portion of the powered machine by a pivot member.

Aspect 76: The system of aspects 62-75, wherein at least one pivot portion comprises an aperture or port for receiving a pivot member.

Aspect 77: The system of aspects 62-76, wherein the first and second pivot portions comprise an aperture or port for receiving a pivot member.

Aspect 78: The system of aspects 62-77, wherein at least one pivot portion further comprises a pivoting means.

Aspect 79: The system of aspects 62-78, wherein the pivoting means is configured to pivot a component attached to the pivot portion around a pivot axis.

Aspect 80: The system of aspects 62-79, wherein the pivot portion defines the pivot axis.

Aspect 81: The system of aspects 62-80, wherein the pivot axis is parallel to the pivot portion.

Aspect 82: The system of aspects 62-81, wherein the pivot axis is perpendicular to the pivot portion.

Aspect 83: The system of aspects 62-82, wherein the first pivot portion is rotatably connected to the second pivot portion by extending the pivot member through a first aperture from a first side of the first pivot portion to a second side of the first pivot portion, and by extending the pivot pin through a second aperture from a first side of the second pivot portion to a second side of the second pivot portion.

Aspect 84: The system of aspects 62-83, wherein the first pivot portion comprises a pivoting means configured to rotate the roller assembly around a pivot axis.

Aspect 85: The system of aspects 62-84, wherein the second pivot portion comprises a pivoting means configured to pivot the roller assembly around a pivot axis.

Aspect 86: The system of aspects 62-85, wherein the first pivot portion comprises a first pivoting means configured to rotate the roller assembly around a first pivot axis, and the second pivot portion comprises a second pivoting means configured to pivot the roller assembly around a second pivot axis.

Aspect 87: The system of aspects 62-86, wherein the pivot axis is parallel to a movement direction.

Aspect 88: The system of aspects 62-87, wherein the pivot axis is parallel to a movement direction and corresponds with a contact point between the roller component and a surface elevation of a medium thereby positioning the pivot axis correspondingly to the surface elevation at the point of contact.

Aspect 89: The system of aspects 62-88, wherein the pivot axis is parallel to a movement direction; and wherein the roller device is configured to maintain the pivot axis substantially aligned with a vertical plane parallel to the movement direction and substantially corresponding with a contact point between the roller component and a surface upon which the roller component is supported; wherein the pivot axis will substantially remain at a fixed point relative to the roller component as the pivoting means rotates about its axis.

Aspect 90: The system of aspects 62-89, wherein the second pivot point is position below the first pivot point; and thereby allowing the roller device to contour to a surface elevation of a medium being compressed independent of the position of the powered machine in relationship to the contour of the surface medium.

Aspect 91: The system of aspects 62-90, wherein the roller device is configured to pivot around the third pivot point.

Aspect 92: The system of aspects 62-91, wherein the roller device is configured to pivot up and down around the third pivot point.

Aspect 93: The system of aspects 62-92, wherein the third pivot portion is configured to allow the roller device to contour to the surface elevation of a medium being compressed, independent of the position of the powered machine in relationship to the contour of the surface medium.

Aspect 94: The system of aspects 62-93, wherein when the attachment frame and roller assembly are connected, the support arms are oriented to the ground at an angle of from about 15 to about 75 degrees.

Aspect 95: The system of aspects 62-94, wherein the pivot member comprises a pin, shaft, rod, axle spindle, spindle bearing, or bushing, or a combination thereof.

Aspect 96: The system of aspects 62-95, wherein the pivoting means comprises a bearing, or bushing, or a combination thereof.

Aspect 97: The system of aspects 62-96, wherein the bearing comprise as a ball bearing, spindle bearing, or bushing, or a combination thereof.

Aspect 98: The system of aspects 62-97, further comprising a powered machine connected to the attachment frame.

Aspect 99: The system of 98, wherein the powered machine can comprise any motor driven machine that can support the weight of the roller device.

Aspect 100: The system of aspects 62-99, wherein the powered machine comprises a lawn maintenance machine, walk behind mower, riding mower, tractor, skid-steer, motor driven vehicle, all-terrain vehicle (ATV), or utility task vehicle (UTV), or powered track-driven wheeled device.

Aspect 101: The system of aspects 62-100, wherein the rotating means comprises a shaft, an axle, a bearing, or bushing, or a combination thereof.

Aspect 102: The system of aspects 62-101, wherein the roller frame ends are connected to the roller component using axle bearings.

Aspect 103: The system of aspects 62-102, wherein the rotating means comprises a shaft having first and second ends, where the first end of the roller frame is connected to a first end of the shaft, the second end of roller frame is connected to the second end of the shaft.

Aspect 104: The system of aspects 62-103, wherein the shaft is fixedly connected to the roller frame ends through apertures in the roller frame ends and secured by pins.

Aspect 105: The system of aspects 62-104, wherein the roller component has a substantially cylindrical body.

Aspect 106: The system of aspects 62-105, wherein the roller component has a substantially cylindrical body and convex shaped ends.

Aspect 107: The system of aspects 62-106, wherein the roller component is a weighted cylinder, drum, or tank.

Aspect 108: The system of aspects 62-107, wherein the roller component is comprised of a heavily weighted material or any material capable of holding a weighted substance within the roller component while maintaining rigidity during rotational operation.

Aspect 109: The system of aspects 62-108, wherein the roller component is comprised of metal, non-metal, magnetic or non-magnetic, polymer, plastic, resin fiber, steel, aluminum or a metal alloy, or a combination thereof.

Aspect 110: The system of aspects 62-109, wherein the roller component comprises an aperture of circular cross section extending axially through the roller component for being placed in mating relation with the shaft.

Aspect 111: The system of aspects 62-110, wherein the roller component is disposed over the shaft for rotation around the shaft.

Aspect 112: The system of aspects 62-111, wherein an axis on which the roller component rotates is spaced apart behind from a vertical axis of the pivot member on which the roller support turns; and wherein the roller component follows behind the pivot portion of the attachment frame.

Aspect 113: The system of aspects 62-112, wherein the roller assembly is self-guided in a desired path in front of the powered machine.

Aspect 114: The system of aspects 62-113, wherein the roller assembly has full 360-degree rotational capability while being driven from behind by the powered machine, but yet allowing the roller assembly to be pulled forward from behind.

Aspect 115: The system of aspects 62-114, wherein the roller assembly tracks behind the pivot portion and is configured to adjust its own path effectively while being propelled through a turn.

Aspect 116: The system of aspects 62-115, wherein the device is configured to reach corners or other confined areas out of reach in normal turning.

Aspect 117: The system of aspects 62-116, wherein the device is configured to adjust and select any desired turning radius, and wherein It is not dependent upon the turning radius of the powered machine to which it is attached.

Aspect 118: The system of aspects 62-117, wherein the device is configured to be backed up and propelled back and forth as required.

Aspect 119: The system of aspects 62-118, wherein the device is configured to be backed up and propelled back and forth at an angle from 0 to 360 degrees while still allowing full use and the forward pulling operational path.

Aspect 120: The system of aspects 62-119, wherein the device is configured to compress a medium.

Aspect 121: The system of aspects 62-120, wherein the medium is the ground, earth, dirt, grass, gravel, stone, sand, cullet, volcanic based material, lunar based material, potash, slag, or mulch, or a combination thereof.

Aspect 122: The system of aspects 62-121, wherein the device is configured to eradicate ground moles located in a tunnel beneath the surface of the ground by compressing the ground and tunnel ridges, thereby returning the ground and surface contour/elevation to the same elevation as media adjacent to the tunnel ridges.

Aspect 123: A method for compressing a medium, the method comprising: a) providing the system of aspect 62; and b) contacting a medium with the roller component to thereby compress the medium.

Aspect 124: The method of aspect 123, further comprising the step of introducing a suffocant into the medium prior to contacting the medium or after contacting the medium, or a combination thereof.

Aspect 125: The method of aspect 123, further comprising the step of introducing a suffocant into the medium prior to contacting the medium.

Aspect 126: The method of aspect 123, further comprising the step of introducing a suffocant into the medium after contacting the medium.

Aspect 127: The method of aspects 123-126, the medium is the ground, earth, dirt, grass, gravel, stone, sand, cullet, volcanic-based material, lunar-based material, potash, slag, or mulch, or a combination thereof.

Aspect 128: The method of aspects 124-127, wherein the suffocant is a vapor that is toxic to rodents.

Aspect 129: The device of any preceding aspect, wherein the device comprises a plurality of roller components.

Aspect 130: The device of any preceding aspect, wherein each roller component is configured to rotate independent of other roller components.

Aspect 131: The system of any preceding aspect, wherein the system comprises a plurality of roller components.

Aspect 132: The system of any preceding aspect, wherein each roller component is configured to rotate independent of other roller components.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A roller device for attachment to a powered machine, the roller device comprising:

a) an attachment frame configured to detachably connect to a front portion of a powered machine, the attachment frame comprising:
  i) at least one support arm having first and second opposed ends, the first end having a first pivot portion configured to receive a pivot member, and the second end being configured to connect to the front portion of the powered machine;
b) a roller assembly comprising:
  i) at least one rotatable roller component;
  ii) at least one roller frame having first and second ends, the first end being rotatably connected to a first end of the roller component with a rotating means configured to allow rotation of the roller component, the second end being rotatably connected to a second end of the roller component using a rotating means configured to allow rotation of the roller component, and the roller frame having a second pivot portion being configured to connect to the first pivot portion; and
c) a pivot member connecting the first and second pivot portions;
  wherein the roller assembly can rotate 360-degrees about the attachment frame while being driven from behind by an attached powered machine;
  wherein the roller assembly is configured to be pulled forward in a desired path upon forward movement of an attached powered machine;
  wherein the first pivot portion is configured to rotate the roller assembly around a first pivot axis, and the second pivot portion is configured to pivot the roller assembly about a second pivot axis;
  wherein a vertical axis on which the roller component rotates is spaced apart behind from a vertical axis of the pivot member on which the roller assembly rotates; and
  wherein the roller component follows behind the first pivot portion of the attachment frame.

2. The device of claim 1, wherein the roller assembly tracks behind the pivot member and is configured to maintain alignment by pivoting about the pivot member at the second pivot portion.

3. The device of claim 2, wherein the first pivot portion comprises a first pivoting means configured to rotate the roller assembly around the first pivot axis, and the second pivot portion comprises a second pivoting means configured to pivot the roller assembly around the second pivot axis.

4. The device of claim 3, wherein the second pivot axis is parallel to a movement direction and corresponds with a contact point between the roller component and a surface elevation of a medium thereby positioning the second pivot axis correspondingly to the surface elevation at the point of contact.

5. The device of claim 3, wherein the second pivot axis is parallel to a movement direction; and wherein the roller device is configured to maintain the second pivot axis substantially aligned with a vertical plane parallel to the movement direction and substantially corresponding with a contact point between the roller component and a surface upon which the roller component is supported; and wherein the first pivot axis will substantially remain at a fixed point relative to the roller component as the first pivoting means rotates about its axis.

6. The device of claim 3, wherein when the attachment frame and roller assembly are connected, the roller frame is oriented to the ground at an angle of from about 15 to about 75 degrees.

7. The device of claim 6, further comprising a powered machine connected to the attachment frame.

8. The device of claim 7, wherein the powered machine comprises a lawn maintenance machine, walk behind mower, riding mower, tractor, skid-steer, motor driven vehicle, all-terrain vehicle (ATV), or utility task vehicle (UTV), or powered track type machine.

9. A method for compressing a medium, the method comprising:
 a) providing the device of claim 7; and contacting a medium with the roller component to thereby compress the medium.

10. The device of claim 1, wherein the attachment frame comprises two support arms, wherein the first ends are connected to the first pivot portion, and wherein the second ends are configured to detachably connect to a first and second front portions of the powered machine.

11. The device of claim 1, wherein the second end of the support arm further comprises a third pivot portion rotatably connected to a portion of the powered machine by a pivot member.

12. The device of claim 1, wherein the first and second pivot portions comprise an aperture or port for receiving a pivot member.

13. The device of claim 1, wherein the roller device is not dependent upon the turning radius of the powered machine to which it is attached.

14. The device of claim 1, further comprising a plurality of roller components.

15. The device of claim 14, wherein each roller component is configured to rotate independent of other roller components.

16. A medium compressing system, the system comprising:
 a) a powered machine
 b) a roller device comprising:
  i) an attachment frame configured to detachably connect to the powered machine, the attachment frame comprising:
   1. at least one support arm having first and second opposed ends, the first end having a first pivot portion configured to receive a pivot member, and the second end being configured to connect to a portion of the powered machine;
  ii) a roller assembly comprising:
   1. at least one rotatable roller component;
   2. at least one roller frame having first and second ends, the first end being rotatably connected to a first end of the roller component with a rotating means configured to allow rotation of the roller component, the second end being rotatably connected to a second end of the roller component using a rotating means configured to allow rotation of the roller component, and the roller frame having a second pivot portion being configured to connect to the first pivot portion; and
   iii) a pivot member connecting the first and second pivot portions;
 wherein the roller assembly can rotate 360-degrees about the attachment frame while being driven by the powered machine;
 wherein the roller assembly is configured to be pulled forward in a desired path upon forward movement of an attached powered machine;
 wherein when the first and second pivot portions are connected by the pivot member;
 and wherein the roller assembly tracks behind the pivot member and is configured to maintain alignment by pivoting about the pivot member at one or more pivot portions.

17. The system of claim 16, wherein the attachment frame comprises two support arms, wherein the first ends are connected to the first pivot portion, and wherein the second ends are configured to detachably connect to a first and second front portions of the powered machine.

18. The system of claim 16, wherein the first pivot portion comprises a first pivoting means configured to rotate the roller assembly around a first pivot axis, and the second pivot portion comprises a second pivoting means configured to pivot the roller assembly around a second pivot axis.

19. The system of claim 18, wherein the second pivot axis is parallel to a movement direction; and wherein the roller device is configured to maintain the second pivot axis substantially aligned with a vertical plane parallel to the movement direction and substantially corresponding with a contact point between the roller component and a surface upon which the roller component is supported; wherein the first pivot axis will substantially remain at a fixed point relative to the roller component as the first pivoting means rotates about the first pivot axis.

20. The system of claim 19, wherein the second pivot point is positioned below the first pivot point; and thereby allowing the roller device to contour to a surface elevation of a medium being compressed independent of the position of the powered machine in relationship to the contour of the surface medium.

* * * * *